(12) United States Patent
Taricani, Jr.

(10) Patent No.: US 7,480,626 B1
(45) Date of Patent: *Jan. 20, 2009

(54) COMPUTER-BASED SYSTEM FOR SIMPLIFICATION OF TAX COLLECTIONS AND REMITTANCES FOR INTERNET AND MAIL ORDER COMMERCE

(75) Inventor: Joseph F. Taricani, Jr., San Rafael, CA (US)

(73) Assignee: Interstate Solutions, LLC, Corona Del Mar, CA (US)

( * ) Notice: Subject to any disclaimer, the term of this patent is extended or adjusted under 35 U.S.C. 154(b) by 1576 days.

This patent is subject to a terminal disclaimer.

(21) Appl. No.: 10/030,139

(22) PCT Filed: Jul. 26, 2000

(86) PCT No.: PCT/US00/19551

§ 371 (c)(1),
(2), (4) Date: Aug. 22, 2002

(87) PCT Pub. No.: WO01/08064

PCT Pub. Date: Feb. 1, 2001

Related U.S. Application Data

(60) Provisional application No. 60/145,270, filed on Jul. 26, 1999, provisional application No. 60/148,285, filed on Aug. 11, 1999, provisional application No. 60/165,657, filed on Nov. 16, 1999.

(51) Int. Cl.
*G06Q 30/00* (2006.01)
(52) U.S. Cl. .......................... 705/19; 705/16; 705/17; 705/26; 705/31
(58) Field of Classification Search .............. 704/16, 704/17, 19, 26, 31
See application file for complete search history.

(56) References Cited

U.S. PATENT DOCUMENTS 5,644,724 A 7/1997 Cretzler (Continued)

OTHER PUBLICATIONS

S. Feldman, Buying Smart: Everything you need to know to pick up the phone and buy with confidence, vol. 1, No. 10, Oct. 1999.

(Continued)

*Primary Examiner*—Raquel Alvarez
(74) *Attorney, Agent, or Firm*—Oblon, Spivak, McClelland, Maier & Neustadt, P.C.

(57) ABSTRACT

An effective and efficient system for recovering tax revenue. One implementation is to recover tax revenue currently not being recovered by storing data in a database (2) indicating interstate sales transactions (7) on which a seller does not collect a designated tax, such as a sales tax. This database (2) is part of a computer network (1) that organizes and stores the data in the database (2) and automatically sends out tax due notices (S3) to purchasers (5) when data in the database (2) indicates that an interstate sale has taken place and no designated tax has been collected from the purchaser (5) by the seller. This database (2) can also be updated to reflect payment of the tax indicated in the tax due notice (S3), and can automatically remit appropriate revenues to a revenue agency (4) when the tax due notice has been paid (S4). One implementation is also collecting a tax on all interstate sales transactions (7) by using a central facility that assists remote sellers in knowing what rate to employ for any given transaction and receiving and distributing collected taxes to the appropriate revenue agencies (4).

34 Claims, 13 Drawing Sheets

U.S. PATENT DOCUMENTS 5,875,433 A * 2/1999 Francisco et al. ............. 705/26
6,016,479 A 1/2000 Taricani, Jr.
6,347,304 B1 2/2002 Taricani, Jr.

OTHER PUBLICATIONS

U.S. Appl. No. 10/030,139, filed Jan. 28, 2002, pending.

* cited by examiner

| PURCHASER NAME | ADDRESS 1 | ADDRESS 2 | SALE DATE | SALE MOUNT | CATEGORY | REVENUE AGENCY CODE |
|---|---|---|---|---|---|---|
| | | | | | | |

FIG. 4

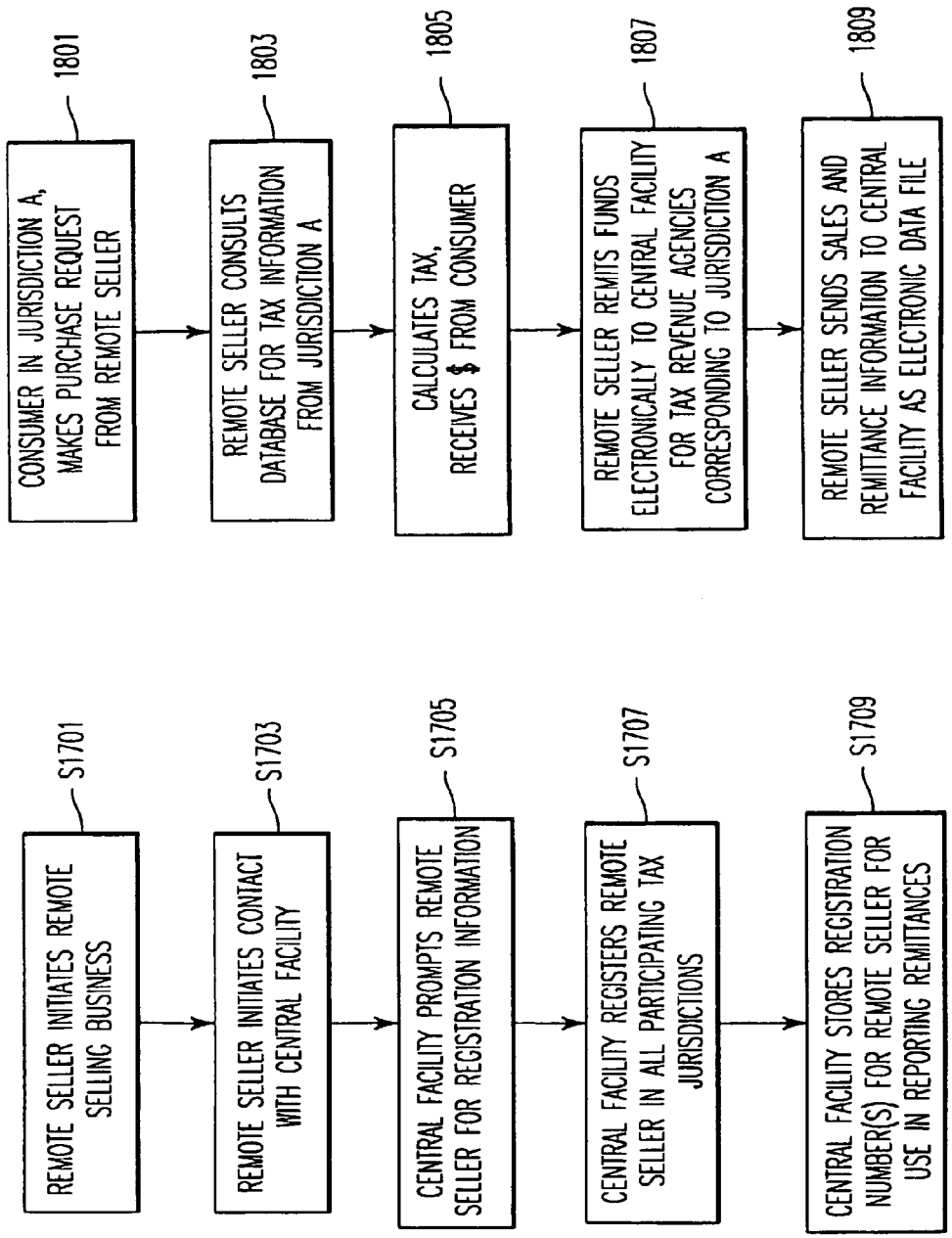

COMPUTER-BASED SYSTEM FOR SIMPLIFICATION OF TAX COLLECTIONS AND REMITTANCES FOR INTERNET AND MAIL ORDER COMMERCE

CROSS-REFERENCE TO RELATED APPLICATIONS

The present document contains subject matter related to that disclosed in U.S. Pat. No. 6,016,479, issued Jan. 18, 2000 to the present inventor, and continuation application Ser. No. 09/417,900, filed Oct. 14, 1999, both of which being incorporated herein by reference. The present document also claims the benefit of the earlier filing dates of, and contains subject matter related to that disclosed in commonly owned, co-pending application Ser. No. 60/145,270, filed Jul. 26, 1999, co-pending application Ser. No. 60/148,285, filed Aug. 11, 1999, and Ser. No. 60/165,657 filed Nov. 16, 1999, the entire contents of all of which being incorporated herein by reference.

BACKGROUND OF THE INVENTION

1. Field of the Invention

The present invention is directed to methods, computer-based systems and computer program products that recover tax revenue, and that in one particular operation assists in the recovery of taxes due on interstate sales, including mail-order and Internet sales, on which no tax was collected at the time of sale or subsequently remitted by a purchaser, and that in one further particular operation collects a simplified tax and appropriately routes the collected revenue to the appropriate governmental agency. In another particular operation, the present invention is directed to methods and computer-based systems that recover tax revenue on interstate sales where a tax amount was first determined and calculated for one of many different jurisdictions, and distributed through a central facility to the appropriate revenue agency or revenue agencies.

2. Discussion of the Background

At the present time the vast majority of sales that take place by mail-order or over the Internet (or other "virtual" sales forums) avoid taxation by either the state in which the selling company is located or the state in which the purchaser is located. For example, if a buyer in Maryland purchases a product over the Internet or through mail-order from a company in California, the seller does not collect sales tax on that sales transaction since the sale did not technically take place in California, and the buyer was not physically located in California at the time of sale. Maryland does not receive a tax on that sales transaction because, undoubtedly, Maryland revenue officials would not have been made aware of the sale. While the buyer, a Maryland resident, has an obligation to pay a Use tax, few individuals voluntarily pay the tax (or are even aware of their obligation to pay the tax).

At the present time state revenue agencies are limited in their ability to require out-of-state businesses with no physical presence in their state, e.g., mail-order or Internet sellers, to collect sales taxes that are due from purchases made by residents in their state. The determining factor as to whether a state can require a seller to collect its sale taxes is a detected "nexus", physical presence (or lack thereof), on the part of the seller, which determines collection responsibility. In the example noted above, the state of Maryland cannot compel the seller in California to collect Maryland sales tax from the purchaser in Maryland because the seller in California does not have any physical presence in, i.e. "nexus" with, the state of Maryland. Thus, unlike intrastate sales, where the state may place the tax collection burden on the seller, the state does not have the legal power to place the tax collection burden on out-of-state sellers. Furthermore, due to the lack of information regarding the sale, and the lack of a communications infrastructure to send tax due notices or seamlessly collect the tax at the time of sale and monitor the remittance of funds, states routinely experience significant lost opportunities to collect taxes on interstate sales made via these mediums.

Moreover, if a business does not maintain any physical presence in a particular state, but sells merchandise to a resident of that state, the business is not burdened with collecting sales tax at the time the sale is made. However, most states that have sales taxes also place an obligation on the purchaser of that state to pay the required tax (as determined by state sales tax provisions) whether the tax is collected by the seller or not (i.e., the burden is placed on the buyer to voluntarily pay the tax). Certain states also have a "Use" tax which can be levied on such sales in lieu of a sales tax, but which is generally at the same rate as the state sales tax. The reality is, however, that such purchasers of mail-order and Internet sales will rarely voluntarily pay the required sales or use tax, therefore violating use tax laws in their state. Further, state revenue agencies are severely disadvantaged if the seller does not collect the required tax because the state revenue agency rarely finds out that a sale was made, and thus is unaware of the taxable sale. Since revenue agencies are not aware of such sales transactions, and as consumers rarely voluntarily pay the required applicable sales or use tax, a large amount of revenue is currently uncollected.

This problem of allowing such taxable transactions to go unrecorded and thereby be untaxed is accelerating rapidly as Internet sales increase. It has been estimated that lost revenue for state revenue agencies will be measured in tens of billions of dollars by the year 2002. Moreover, in-state taxpaying businesses have complained of a disadvantage to their respective firms in being required to charge sales tax, while mail-order and Internet sales do not impose and collect a sales tax.

In one effort to contend with this lost revenue opportunity, enforce taxpayer responsibility, and to create a level playing field for such in-state taxpaying businesses, some states have joined with other states in arrangements known as "Compacts". Under such "Compacts", Compact members agree to share transaction information retrieved via revenue department audits of in-state mail order and Internet-based firms with other members of the Compact. Such audits frequently reveal sales to residents of other states in the Compact. This information is then provided to the Compact members for purposes of billing their taxpayers for such sales. However, at the present time such Compact arrangements are fragmented and yield modest revenue recovery, and do not create the necessary scale to build an effective billing and collection system.

Also, it has been suggested at different times in Congress, pursuant to its Commerce Clause power to regulate interstate commerce, to require mail-order sellers to keep track of each out-of-state sale and to collect the appropriate sales tax for each out-of-state sale. However, at this time no such requirement has been implemented due to the burdensome nature of requiring a seller to monitor sales taxes which can vary not only between the different states, but also between different jurisdictions within the states. It has been estimated that there are thousands of different taxing jurisdictions (about 6,500), each of which has the authority to charge different sales taxes. Shifting such a tax collection burden from the states themselves to the sellers would serve as yet another taxation—a government mandated activity levied on sellers, which presumably would give "big business" an unfair advantage over small "mom and pop" franchises who barely have sufficient resources to conduct their own business, let alone calculate, collect and distribute interstate taxes for which the business gets no monetary gain or economic value. To further complicate matters, these jurisdictions have different tax rates, and also have different provisions for not taxing certain merchandise, e.g., some states do not tax the sale of food or certain clothing. Requiring a seller, particularly small businesses such as those emerging on the Internet, to collect the taxes for each of these different jurisdictions has been found to be burdensome and thus has not been implemented. Although a tax is due on the Maryland purchase, the California company is not required to collect the tax if the company has no physical presence in Maryland.

If Congress did act to change the law and provide a "national solution", Congress would most likely require massive simplification. Moreover, the standard approach would remove the sovereignty of the 6,500 different taxing jurisdictions by imposing a single tax (or some modified tax) to be collected by the seller, and remitted to the appropriate revenue agency. The implications of this approach are addressed by comparing FIGS. 13 and 14. In FIG. 13, a consumer 1301 makes a purchase from a local vendor 1303 (referred to as "main street seller"). Because the transaction is made within a state, the main street seller 1303 applies the state and local sales tax that applies to that particular jurisdiction, and remits the same to a revenue agency 1305. These taxes are withheld and submitted to the revenue agency on a periodic basis. The present discussion is focused on sales tax, but the same discussion applies to employment "wage" taxes, transportation taxes and other taxes to be collected on behalf of multiple jurisdictions.

FIG. 14 is directed to a situation where the main street seller 1303 now wants to enter the business of becoming a remote seller 1400, perhaps by establishing an Internet web site that offers products to different consumers 1404 located around the United States or around the world. In this situation, the remote seller 1400 is relieved of the obligation of collecting sales tax for consumers 1402, if that remote seller 1400 does not have a nexus with the state of residence of the consumer 1402. However, if as discussed above, Congress imposes a legal obligation on the remote seller 1400 to impose a sales tax, and collect and remit that tax, the remote seller 1400 is placed in an unreasonably burdensome situation. As shown, a dutiful remote seller would be required to register as a seller with the 6,500 or so revenue agencies 1404, 1406, 1408 and 1410. Once registered, the remote seller 1400 would then be obligated to monitor the different taxes that are imposed on a particular consumer by the different revenue agencies. Thus, the remote seller 1400 must maintain a current knowledge of the taxes imposed by the respective revenue agencies, which may change over time, particularly after new elections in those particular jurisdictions are held. Once the appropriate tax rate has been identified, the remote seller 1400 must calculate the appropriate tax, include that tax on the purchase amount by the respective consumers 1402, and then remit with filing statements the collected tax to the respective revenue agencies, on a periodic basis. Certainly, the burden imposed by such a structure, particularly on relatively small up-start companies, would be unduly burdensome and not a practical solution. Thus, as discussed above, it is generally believed that the practical solution is to impose a seamless process for all transactions made, so that the remote seller 1400 will know how much tax to collect at any given time for any given consumer in any given jurisdiction.

Presently, the taxes that get withheld on the quarterly sales is about $41 billion in taxes and on wages its on the order of $275 billion. There is a cost for floating these funds. On a quarterly basis, the float cost to the government agencies is very large. So on an annual basis, if the remittance cycle time is reduced from about an average of 15 days to 5 days, the accelerated remittance could create an appreciable amount of otherwise lost revenue. This loss of money is not presently recognized as a limitation with the conventional approach to collecting taxes, because it is presently viewed that the complexity associated with actually requiring the sellers to collect and remit these taxes within a shorter period of time is not practical. Accordingly, for the single-jurisdiction sales transaction, the amount of revenue received by the revenue agency, is reduced by the time-value of money, by delaying the amount of time before the main street seller 1303 has to remit the collected sales tax.

As presently recognized, the above-described "solution", is impractical in that it requires a federally mandated solution, which imposes a federal solution to resolve "state taxation issues" simply because there are no proposed practical solutions for collecting the taxes. As presently viewed, the mechanism of changing the tax rate at the state, and local jurisdiction level to be uniformly applied across the United States, is a "solution", that is an attempt to change the "tax rate system" rather than changing the "tax collection machine" to accommodate the existing tax system.

In contrast to conventional wisdom, the present inventor recognized that rather than change the tax codes, a better solution for the consumer, remote seller and revenue agency, is change the "tax collection system" by having a centralized facility that performs the function of registering remote sellers, providing the remote sellers with information regarding the appropriate taxes that are to be due on any given purchase, and providing the infrastructure for collecting, distributing and reporting the information associated with those particular taxable events. The centralized facility could also be used to accelerate collection of corporate wage taxes, transportation taxes, international tariffs, foreign national sales taxes and the like.

Another problem with conventional tax revenue systems is that there are currently no efficient systems to route collected tax revenues to the appropriate revenue agencies, or to verify that the taxes are being collected. Such problems would only be exacerbated if a seller was required to collect sales taxes for all taxing jurisdictions on out-of-state sales.

One solution to a related, but different, problem is disclosed in U.S. Pat. No. 5,644,724 to Cretzler. This patent describes a system for more efficiently routing in-state sales tax revenues from credit card transactions to an appropriate state revenue collecting agency. However, the system of Cretzler is only applied to credit card transactions and does not even address interstate sales transactions on which no tax is currently collected, and for which no infrastructure is established to identify taxable events, determine if a tax was voluntarily paid on the taxable event, issue a notice if the tax was not paid after a predetermined period of time, and perform periodic checks to determine if the tax was subsequently paid.

Cretzler does not also address the significant burden associated with coding systems and product codes to conform to the multiple tax codes in the United States.

Presently, services are available that describe and update tax rates for different jurisdictions across the United States. Accordingly, subscribers are kept informed of different tax rates for different jurisdictions, which assist sellers in identifying appropriate taxes for situations in which those particular sellers have a nexus, and thus an obligation to collect and remit taxes. Furthermore, the service does not provide a function for registering that particular remote seller in the different revenue agencies to which the taxes may apply. Furthermore, the services do not offer the functions of remitting and electronically filing the tax revenue, in an efficient manner.

SUMMARY OF THE INVENTION

The inventor of the present invention has recognized that currently no effective methods, systems or computer program products are available to assist in collecting sales or use taxes on interstate transactions (including Internet and mail-order) in which the seller does not collect the tax. Accordingly, one object of the present invention is to provide a solution to this problem, as recognized by the present inventor.

The inventor of the present invention has also recognized that currently no efficient methods, systems or computer program products exists to assist in routing collected revenue on sales taxes to appropriate revenue collection agencies. Accordingly, a further object of the present invention is to provide a solution to this problem, as recognized by the inventor.

The present inventor also recognize that existing systems, methods or computer program products, do not exist that enable the remote sellers to conveniently register as tax collecting entities for multiple taxing jurisdictions. Accordingly, a further object of the present invention is to provide a solution to this problem. The present inventor also recognized that new efficient methods, systems and computer program products are needed, that enable electronically remitted taxes to be collected at a single site, and then allow for electronic data files to serve as filing returns, so as to inform the respective revenue agencies regarding the taxes that have been collected on behalf of that particular remote seller. Accordingly, yet a further object of the present invention is to provide a solution to this problem.

To achieve these and other objects, the present inventor has invented a novel computer-based system, method and computer program product, by which interstate sales tax collection is performed in a seamless, cost-effective manner, and which fairly applies existing (and contemplated) laws to consumers depending on state guidelines, and does not unfairly shift the government's burden of tax collection to the seller.

In one implementation, the present invention populates a database with data of interstate transactions on which the seller did not collect a designated tax. Such data is then appropriately organized, correlated and reviewed in the database, and tax due notices are automatically sent to purchasers based on such transaction data stored in the database on which no tax was collected.

As a further feature, the novel system, method and computer program product of the present invention verifies whether a tax has been paid on an issued tax due notice, and if so automatically remits the appropriate funds to a revenue agency.

In one further implementation, the present invention sets forth a novel computer-based system, method and computer program product that receives a collected tax from a seller along with (relevant) applicable sales data and stores this data in a database. After organizing and correlating the data, the appropriate transfer of the collected revenue to appropriate revenue agencies is effected.

In a further implementation, the present invention provides a system, method and computer program product that uses a central facility to enable remote sellers to register with the central facility, provide updated multi-jurisdictional tax information, and receive and remit collected sales tax, wage, transportation and other taxes of multiple revenue agencies for multiple jurisdictions. The central facility is also configured to provide access ports for remote sellers to receive tax rate update information from revenue agencies and will collect taxes on behalf of those different revenue agencies.

Other features and facets of the present invention, too numerous to mention in this summary section, will become clear in light of the detailed discussion to follow.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 4 shows one example of a data field structure in one embodiment of the present invention;

FIG. 17 is a flow diagram showing how a remote seller registers in the different taxing jurisdictions by way of the central facility of FIG. 15; and FIG. 18 is a flow diagram illustrating steps in a method where a central facility assists remote sellers in calculating an amount of tax associated with during a taxable event, remitting collected taxes and reporting the collection and remittance of the collected taxes.

DESCRIPTION OF THE PREFERRED EMBODIMENTS

Figure 1:
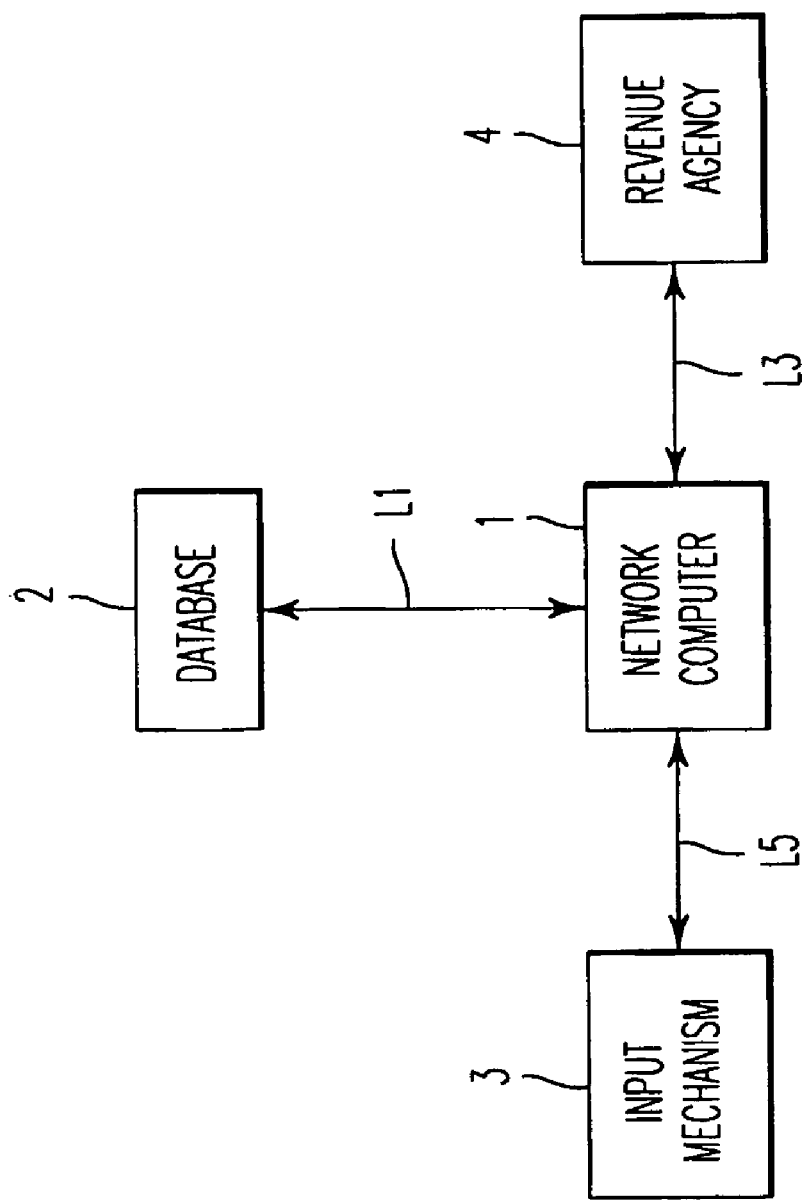
FIG. 1 is a block diagram showing an overall system configuration in one embodiment of the present invention.
Figure 7:
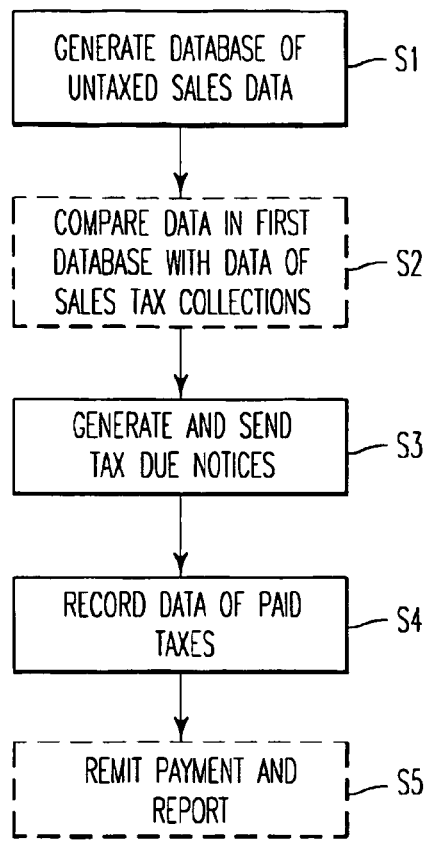
FIG. 7 is a flow diagram of an overall process control system operation in the embodiment of the present invention of FIG. 1.

Referring now to the drawings, wherein like reference numerals designate identical or corresponding parts throughout the several views, and more particularly to FIGS. 1 and 7 thereof, an overall system architecture and system control operation of the present invention is shown.

As shown in FIG. 1, the system of the present invention includes a network computer connected to a database 2, for example by way of a local bus L1. The network computer 1 writes data into the database 2 (i.e., populates the database 2) and retrieves data from the database 2. The network computer 1 is also connected to a revenue agency 4 by way of a data link L3 (e.g. a proprietary land line with T-1 to T-3 bandwidth, although other links may be used as well, such as one or more ISDN links, wireless links, fiber cables, and other links that preferably are digital so as to support data encryption). The link L3 carries exchange information between the network computer and the revenue agency 4; this revenue agency 4 can, as one example only, be a state revenue agency (alternatively a county agency, municipality or any other revenue collection agency). The network computer 1 is also connected to an input mechanism 3, via link L3, which inputs data to the network computer 1, including data which can then be stored in the database 2.

The database 2 is a commercially available database, such as an ORACLE 7 or ORACLE 8 available from ORACLE Corporation. However, proprietary or other commercially available hardware and software databases may be used, such as IBM's DB2 or SQL database running on an IBM SP1, SP2, RISC 6000 or mainframe computer. The network computer 1 is a SPARKSTATION available from SUN MICROSYSTEMS, although other computers may be used as well such as an ULTRA ENTERPRISE 10000 available from SUN MICROSYSTEMS or computers mentioned above available from IBM. As discussed in further detail below, the database is hosted in a magnetic RAID drive (such as RAID-0, RAID-1, and RAID-5, with read/write disk space of 20 Thytes), although read/write optical, semiconductor, ferromagnetic, and quantum memories may be used as well, provided the information contained therein is retrievable by the network computer 1.

Further, the database 2 is connected to the network computer 1 either by the link L1, which is a remote or local connection. In remote configurations the link L1 could take the form of a public switch telephone network line (PSTN), a high-speed digital line such as a T-1 or T-3 line, or any type of wireless link such as a cellular network, a very small aperture terminal (V SAT) link, a LEO or GEO satellite link, etc. Of course the database 2 can also be connected to the network computer when L1 is a local link such as a local bus, a PCMCIA bus, universal serial bus (USB), EIA-232, ISDN (ISO 8877), VMEbus, and IEEE 1394 ("FireWire") as described in Wickelgren, I., "The Facts About "FireWire", IEEE Spectrum, April 1997, Vol. 34, Number 4, pp. 19-25, the contents of which are incorporated herein by reference.

The network computer 1 can also have similar connections to the revenue agency 4 and the input mechanism 3. The information communicated between the network computer and the database 2, input mechanism 3 and revenue agency 4 may be sensitive information, and thus can be transmitted using any type of encryption system, including application level encryption such as pretty-good-privacy (PGP) or other encryption/hashing techniques, for example, or data symbol encryption such as with direct sequence or frequency hopping spread spectrum communications, where the communications symbols are spread with a pseudo random noise code. Similarly, error detection and correction coding such as an inner BCH code followed by an outer convolution code adds an additional degree of data protection while serving to preserve information integrity.

The present invention as shown in FIG. 1 can be implemented to efficiently and accurately recover revenue from interstate sales transactions for which a seller does not collect a sales tax. The control operation performed by the network computer is shown in FIG. 7, and is executed by one or more processors in the network computer (which by the way may be a distributed processor having processing resources distributed about a network) reading computer readable instructions encoded in memory in the network computer 3. The operation executed by the network computer 1, in FIG. 1, implementing the control operation of FIG. 7, will now be discussed in greater detail.

In a first operation in the present invention, a database of untaxed sales data is generated in step S1. More specifically, the input mechanism 3 obtains data as to interstate sales transactions on which a tax was not collected by the seller. This data is then provided to the network computer 1, and the collected data is then stored in the database 2, so as to populate the database 2 with interstate sales data. Structuring, sorting, indexing, querying, and controlling the database 2 is performed to implement the functions described herein using techniques available to skilled database programmers, such techniques being described in various publications such as Korth, H. F., et. al., "Database System Concepts", McGraw-Hill, Inc., 1991, ISBN 0-07-044754-3, and Khoshafian, S., et al., "A Guide To Developing Client/Server SQL Applications", Morgan Kaufmann Publishers, Inc., 1996, ISBN 1-55860-147-3, the entire contents of each of which are incorporated herein by reference. The specific manner in which the input mechanism 3 can obtain such data is discussed in further detail below.

The operation then proceeds to step S2, which is an optional step—hence the dashed line, in which the data stored in the database 2 is compared with data hosted by the revenue agency 4. This step addresses a concern that a purchaser of goods may voluntarily pay a sales or use tax on an interstate purchase, or in some other way the purchaser will have been required to pay the sales or use tax. To ensure that such a purchaser is not double-billed, the network computer 1 can in step S2 compare the data in the database 2 with data hosted in a revenue agency database indicating paid taxes on interstate sales. When it is determined that the database 2 contains data for sales transactions on which a tax has already been paid, such sales transactions are deleted from the database 2. To facilitate this comparison process, the database 2 and the revenue agency database may be constructed as a relational database, where one or more records in the database 2 relate to one or more records in the revenue agency database. This step S2 is optional because a revenue agency 4 may not have such records of voluntarily paid taxes available or may not accept such voluntarily paid taxes. Alternatively, the network computer 1 holds the tax paid data on behalf of the revenue agency 4. In this way the revenue agency need not be bothered with maintaining records on who has paid their sales or use tax, and relies on the proprietor of the network computer to maintain this information. In this alternative embodiment, residents remit their taxes directly to the proprietor of the network computer 1.

The operation then proceeds to step S3 in which the network computer 1 after reviewing the data in the database 2 then automatically generates and sends, for example by mail or secure (e.g., encrypted) electronic communication, tax due notices to purchasers of goods on which the appropriate sales or use tax has not been paid. This generating and sending of the tax due notices can, e.g., take place on letterhead of the revenue agency collecting the taxes; in this instance, the operator of the network of the present invention acts as an agent of the revenue agency. Depending on the arrangement with the revenue agency, such tax due notices require payment to be sent directly to the revenue agency 4 or require remittance to the operator of the network computer 1. When the tax due notice indicates payment is to be paid to the network operator, the network operator essentially acts as an independent contractor for the revenue agency 4 and can takes the revenue agency 4 out of the loop of collecting such taxes. Thus, implementing the procedure of FIG. 7 avoids the problem of shifting the tax collection burden on the seller, and also avoids having the government send tax due notices and collect and monitor the payment of tax remittances. Moreover, the system of FIG. 1 when implementing the process of FIG. 7 enables a separate entity to perform the tax collection process on interstates sales with minimal inconvenience on sellers, and state and local governments.

This generation and sending of a tax due notice in step S3 can be triggered by several events. In one case, a tax due notice can be sent for all untaxed sales transactions. However, this system may become cumbersome due to the need to generate and send a large number of tax due notices for relatively small tax amounts. Another alternative is to periodically send one tax due notice report to a purchaser indicating all taxable transactions during a specific time period for which taxes are due. For example, once every month or once every three months a purchaser may receive a tax due notice indicating all purchases for the one-month or three-month period for which taxes are due. Of course, a hybrid type system could also be implemented in which the tax due notices are periodically sent, and in which if a certain purchase is greater than a specific amount, i.e. if a certain purchase is for a large value, say $1,000.00 or more, a specific tax due notice will be issued for that one certain large value purchase.

The network computer can also operate with several revenue agencies, even though only one is shown in FIG. 1. Under this instance, detailed information about sales tax rates and structures for each revenue agency can be part of the computer program product resident within the computer resources available to the network computer 1. The result is that the sales database 2, which will be sorted through computer-based sorting processes, can be organized by revenue agency, with purchase information broken down into database fields of taxable categories and a tax due on an item by item basis. Further, the tax due notices generated by the network computer can include, as noted above, revenue agency letterhead, and can also include a revenue official signature (physical or digital equivalent), the purchaser's name and address, the purchase date, the purchase items broken down into broad categories, seller's name, the tax due, an explanation of the basis for the tax, etc.

After generating and sending the tax due notices in step S3, the operation then proceeds to a step S4 in which recordation is made when the taxes are paid. If the tax payments are to be paid directly to the revenue agency 4, then in this step S4 the network computer 1 accesses a revenue payment database in the revenue agency 4, which database in the revenue agency 4 will be updated when a tax payment is received. This database in the revenue agency 4 may, but need not, be implemented in a similar fashion to the database 2. In this way, the network computer can then monitor the database in the revenue agency 4 to determine whether any taxes have been paid. Alternatively, if the tax payments are to be sent directly to the network operator, then when the tax payments for the tax due notice are received, the data in database 2 is updated to reflect the tax payments.

The operation then proceeds to a step S5, which is applicable to the case that the tax payments are to be sent to the network operator, and in this step S5 the appropriate payment is remitted to the revenue agency 4 along with a report of the taxes collected. Of course if the revenue agency 4 directly receives the tax payments, this step S5 is omitted.

Figure 2:
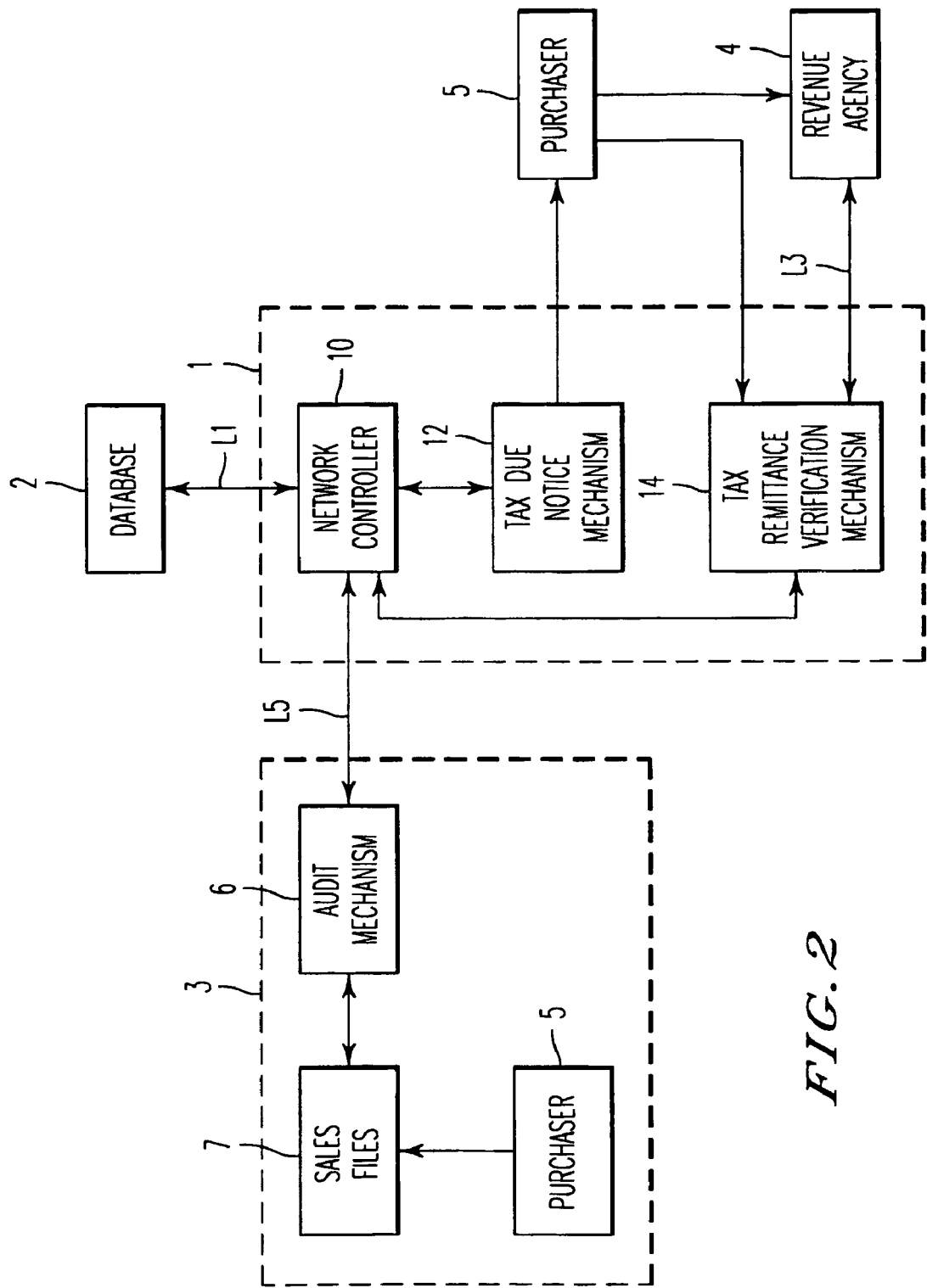
FIG. 2 is a block diagram of a more detailed system configuration in a more specific further embodiment of the present invention.
Figure 8:
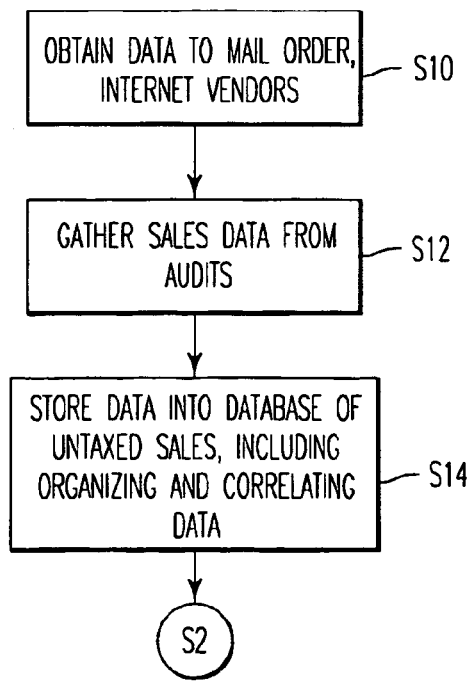
FIG. 8 shows one implementation of one process step of the overall system operation as shown in FIG. 7.

FIG. 2 shows a more detailed block diagram of the overall system of FIG. 1, and which implements one method of initially inputting data of untaxed sales transactions to the network computer 1. FIG. 8 also shows the control operations executed in this embodiment of FIG. 2.

As shown in greater detail in FIG. 2, the network computer 1 includes a network controller 10, a tax due notice mechanism 12, and a tax remittance verification mechanism 14, each of which may be implemented by a CPU in the network computer 1 executing instructions stored in memory, or the hardware/firmware equivalent. In the operation in the present invention, after data of an untaxed sales transaction is input into the database 2, the tax due notice mechanism 12 automatically prints and sends, e.g. mails, a tax due notice to a purchaser 5, as noted in step S3 above. Further, then the purchaser 5 can remit payment to either the revenue agency 4 or to the network operator itself, and then the database 2 can be updated as to tax due notices which have been paid, as noted in step S4.

In the embodiment shown in FIG. 2, the manner in which the input mechanism 3 receives data of the untaxed transactions to be provided to the database 2 is by an audit operation by audit mechanism 6. Also with reference to FIG. 8, a first step in executing an audit is to obtain data of mail-order, Internet, etc., vendors which engage in interstate commerce, see step S10. Then, sales data is gathered from auditing sales file 7 of such interstate sellers, reflecting sales to a purchaser 5 on which no sales tax has been collected by the seller, see step S12. This audit can be a manual audit or can be an automatic audit which electronically scans the sales files 7 of a seller. The sales files 7 can range from paper files which are manually read and input, e.g. through a keyboard, electronically scanned, etc., to commercial databases, e.g., ORACLE 7, ORACLE 8, etc. of the seller which can be searched by search engines, etc.

As noted above, certain states have entered into "Compacts" with other states to exchange such information discovered during state audits. The system shown in FIG. 2 can obtain data of untaxed interstate sales transactions based on such an auditing operation of sales files 7. The data obtained during this audit operation is then stored in the database 2 through network computer 1, and as this data is stored it is organized and correlated, see step S14.

A second implementation of obtaining data of untaxed interstate sales transactions to populate the database 2 is to require sellers to make such information available or to require sellers to download such information to a central data warehouse which can then be accessed by the network computer 1. That is, the collection of data of untaxed sales transactions could be facilitated if a seller is required to record information of an interstate sale for which the seller did not collect a tax, and if the seller is then required to either make this information available to outside parties, or if the seller is required to download such information to a central data warehouse. After this data is then downloaded to a central data warehouse, such data can then be accessed by the input mechanism 3 of FIG. 1, and such data can then be routed to the database 2 through the network computer 1. In this instance, the input mechanism 3 would be a connection to download data from the central data warehouse or from the seller's sales files directly, i.e., without requiring an audit of such materials.

Figure 3:
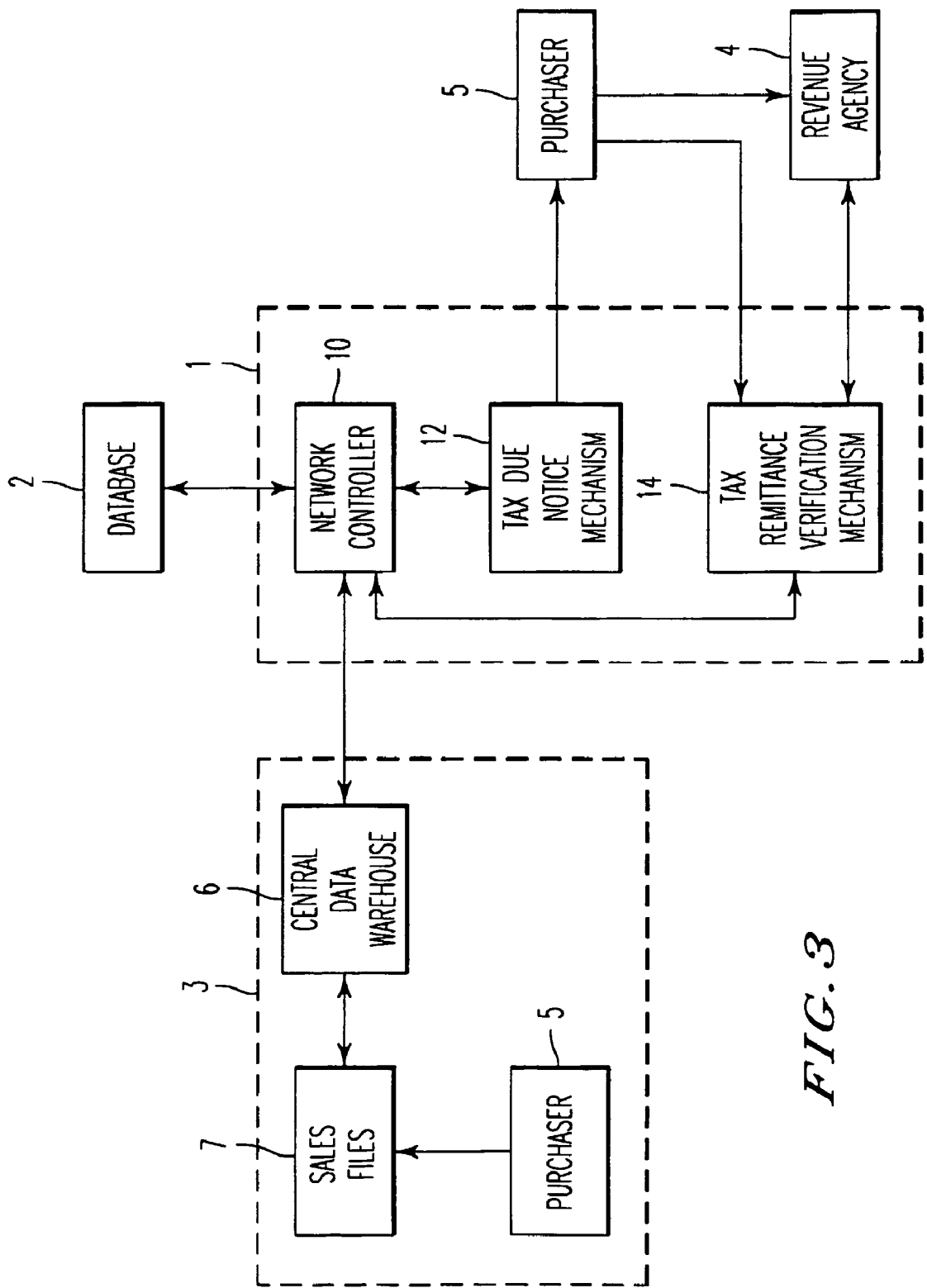
FIG. 3 is a block diagram of a more detailed system configuration in a more specific embodiment of the present invention.

Such a further system of obtaining data of untaxed sales transactions as in the present invention is shown in FIG. 3, and a control operation to implement this system is described with reference to FIG. 9.

As shown in FIG. 3, the input mechanism 3 includes a connection to a central data warehouse 8 that receives information from sales files 7 of sellers engaged in interstate sales. The network controller 10 can be structured to download data from the central data warehouse 8. As an alternative, if a seller is required to make sales files 7 available to outside parties, then the central data warehouse 8 can be omitted and the network controller 10 can directly access a sellers sales files 7 which include data in a specific format that does not require an auditing procedure. It is also noted that in this operation the database 2 may become redundant because the network controller 10 could utilize the central data warehouse 8 as the only large central database. However, if a network operator wishes to further manipulate, organize, correlate, etc., the data from the central data warehouse 8, the database 2 would still be utilized. Thus, the database 2 may be viewed as a local database.

Figures 9, 10:
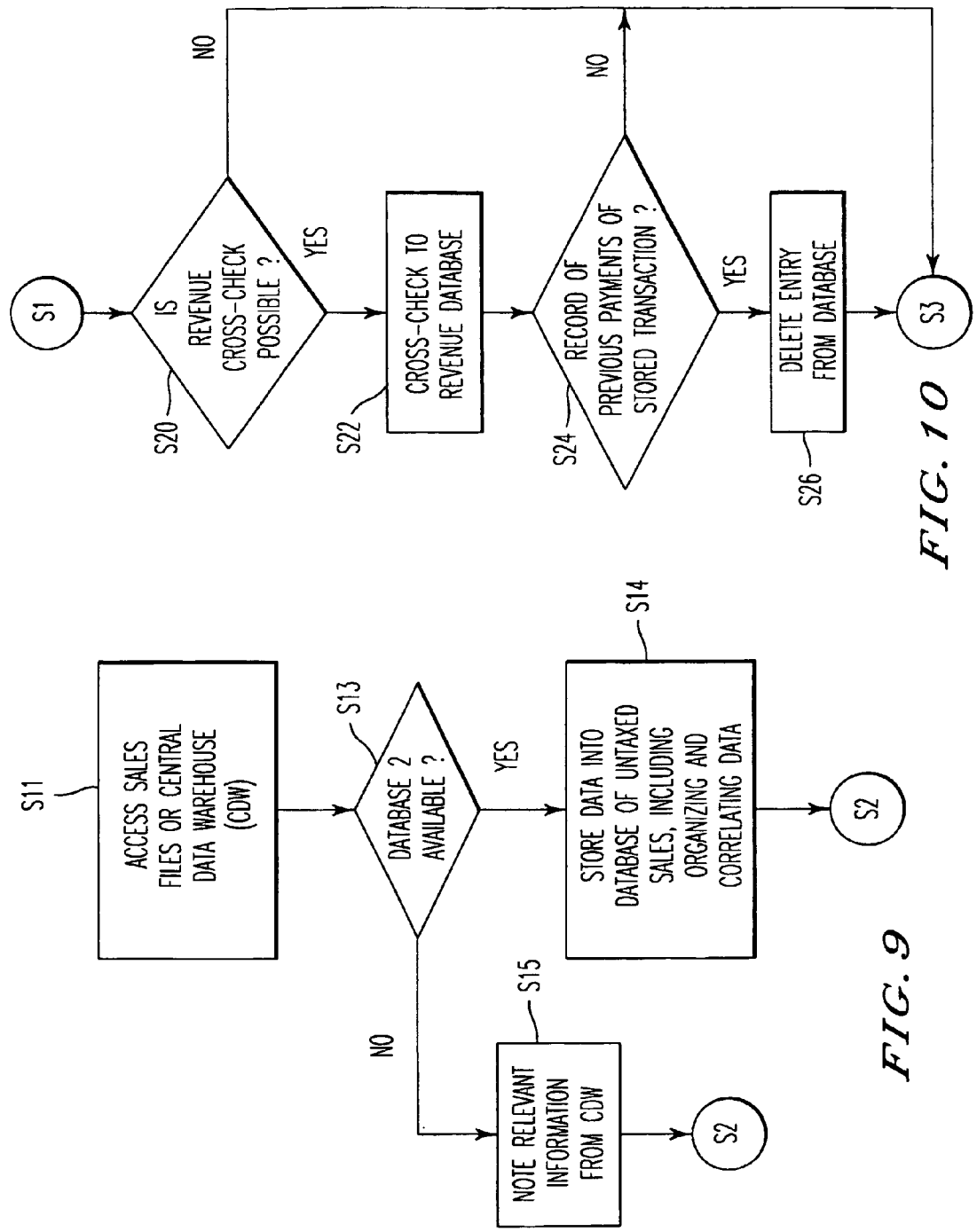
FIG. 9 shows one implementation of one process step of the overall system operation as shown in FIG. 7.
FIG. 10 shows one implementation of one process step of the overall system operation as shown in FIG. 7.

The control operation implemented in this system of the present invention is shown in FIG. 9. As shown in FIG. 9, in a first step S11 either the sales files 7 or central data warehouse 8 is accessed to recover records of untaxed interstate sales transactions. Then, the operation proceeds to step S13 in which it is determined whether the database 2 is available. As noted above, by utilizing a central data warehouse 8 the database 2 need not be required. If no database 2 is available, i.e. NO in step S113, the operation then proceeds to step S15 in which the relevant information from the central data warehouse 8 is accessed. The operation then proceeds to step S2 in FIG. 7 and the ensuing steps. If database 2 is available and is to be accessed, i.e. YES in step S13, then the operation proceeds to step S14, which is the same step as in FIG. 8, in which the data from either the sales files 7 or central data warehouse 8 is organized, correlated and then stored in the database 2. The operation then also proceeds to step S2 in FIG. 7.

As noted above, the database 2 stores data of untaxed interstate sales transactions. A structure of the data fields stored in the database 2 therefore should include a purchaser's name (which may include a unique taxpayer ID and/or the taxpayer's social security number), an address to which a bill was sent (ADDRESS 1), an address to which goods or services were delivered (ADDRESS 2), sale date, sale amount, sale information broken down into broad categories such as clothing, food, merchandise, etc., because each state has different sales and use tax laws depending on the type of purchase transaction and any information as to any claim of tax exemption claimed by the purchaser, and Revenue Agency Code that uniquely identifies the revenue agency to which the tax is to be remitted. FIG. 4 shows the structure of one example of data fields in this database 2. Optionally, a flag field may be added that indicates whether, and how many times, the network computer has checked to determine whether the tax has been remitted by the taxpayer. This flag field includes a separate indication that the tax has been paid, once the network computer 1 verifies the tax has in fact been paid. The flag field may also include an indication as to when the tax was paid so that the network computer will know when to purge (or move to permanent storage, such as an optical media) past payment records.

Figure 5:
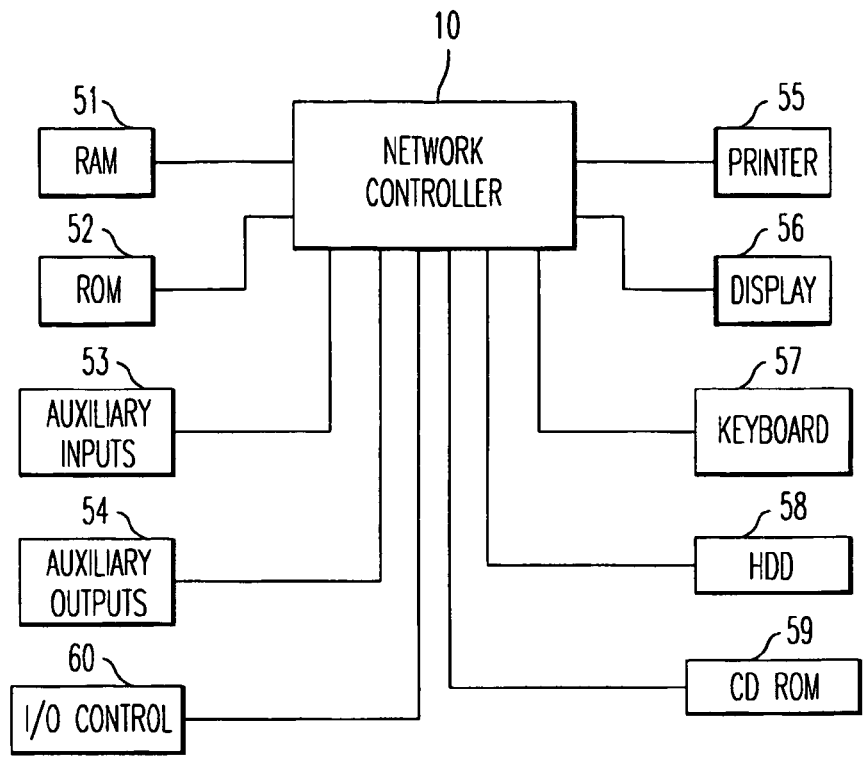
FIG. 5 is a block diagram of system components of a network computer in one embodiment of the present invention.

FIG. 5 shows a specific configuration that the network computer 1 can take. The network computer 1 includes a network controller 10 connected to a RAM 51 and a ROM 52. The network computer 1 also includes a printer 55 to print out tax due notices to be mailed. Alternatively, the tax due notices can be sent by encrypted e-mail through I/O controller 60. Such e-mail messages may optionally include a digital signature, such as that used with DES. The network computer also includes a display 56 and a keyboard 57 (or other user interface combination such as a touch screen display, or voice recognition software), which can include a mouse (not shown), a hard disk drive 58, a CD-ROM 59, auxiliary inputs 53, and auxiliary outputs 54. The network computer 1 can also include a series of such systems connected in a local or wide area network and can of course take on other configurations, such as a distributed processing architecture.

As previously discussed, the network computer 1 can be one or more SUN MICROSYSTEM SPARKSTATIONs that include a semiconductor RAM 51 that receives an application program from ROM 52 which holds an application program for gathering sales data, correlating and organizing the sales data and cross-checking for the payment of the taxes. Other computers, such as those previously discussed, may be used as well, including a network of OMNIPLEX GL5133 computers manufactured by Dell Corporation and connected by way of a local area network or a wide area network. Distributing the processing resources of the network computer 1 may assist in future revenue collection efforts. The network computer 1 (referred to in this example in the singular) includes the display 56 (which may be a plurality of displays if multiple operators implement simultaneous control and query processes) so that an operator can view information input and retrieved from the network controller 10. As noted above, the printer 55 can print the tax due notices, and subsequent notices, as well as reports summarizing tax receipt activity and revenue agency reports. The auxiliary outputs 54 can be used for future expansion capabilities. Further, the memory elements can be configured in a RAID configuration. A RAID configuration allows for local retrieval of state tax statutes, and other database information that may be provided from other commercial databases, such as state revenue agency databases. The auxiliary inputs 53 are also used for expansion capability and the keyboard 15, which as noted above can include a mouse, facilitates user interface. The I/O control 60 further controls all communication between the network computer 1 and the database 2, input mechanism 3 and revenue agency 4.

As shown in FIG. 7, the overall control operation of the present invention can include the step S2 to compare data in the database 2 to data in a revenue agency 4 database to determine whether any taxes have been paid on the transactions stored in database 2. Of course, if the database 2 is not included, which as noted above is a possible configuration in the system as shown in FIG. 3, this compare step S2 will compare data from the central data warehouse 8 to the data in the revenue agency 4 database. The specifics of this operation in step S2 are shown in further detail in FIG. 10.

As shown in FIG. 10, in a first step S20 it is determined whether a revenue cross-check is possible. If a revenue cross-check is not possible, i.e. NO in step S20, the operation immediately proceeds to step S3. If a revenue cross-check is possible, i.e. YES in step S20, the operation proceeds to step S22 in which the data in either the database 2 or the central data warehouse 8 is cross-checked with data in the database of the revenue agency 4. The operation then proceeds to step S24 in which it is determined whether any record of a previous payment of the stored transaction is stored in the revenue agency 4 database. This check may be recorded in the flag field of the record stored in the database 2. If NO in step S24, indicating that no tax has been paid on the stored transaction, the operation again proceeds to step S3. If YES in step S24, indicating that a purchaser has paid a tax on a stored transaction in the database 2 or central data warehouse 8, the operation then proceeds to step S26 where the entry is deleted from the database 2 or is ignored in the central data warehouse 8. The operation then again proceeds to step S3. As an alternative to step S26, the entry is held for a predetermined period of time (e.g., one month) and then purged or stored on permanently storage media.

Figure 11:
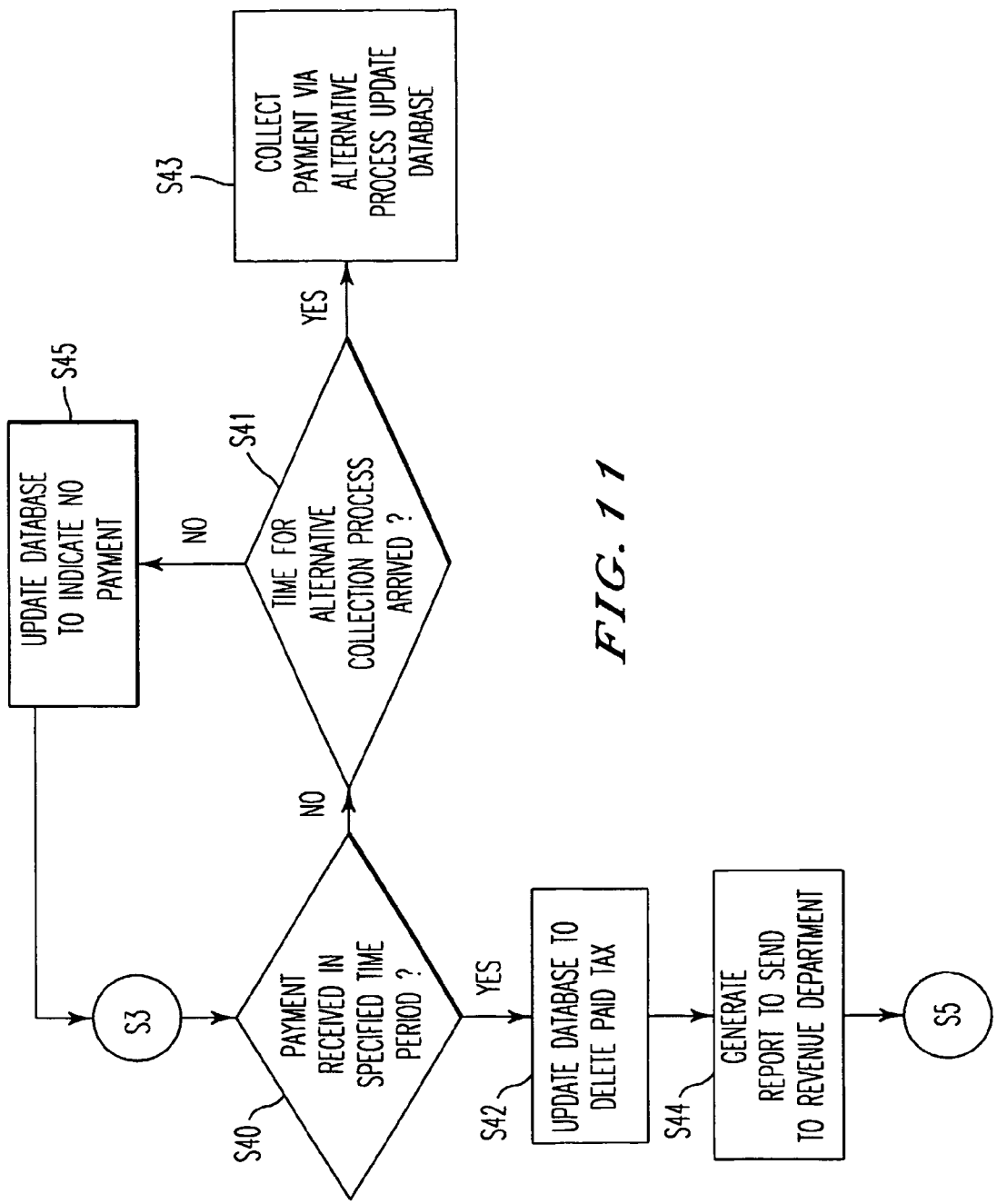
FIG. 11 shows one implementation of one process step of the overall system operation as shown in FIG. 7.

As also noted in the overall control operation of FIG. 7, the present invention can also verify whether a tax remittance has been executed. This operation is shown in FIG. 11, and is implemented by the tax remittance verification mechanism 14 in FIGS. 2 and 3. As noted above, this operation can be executed at the revenue agency 4, or can be implemented in the network computer as a part of the network of FIG. 1.

As shown in FIG. 11, after the tax due notices are generated and sent in step S3, it is then determined in step S40 whether a payment has been received in a specified time period, for example 30 days. If the payment has been received within the specified time period, i.e. YES in step S40, the operation then proceeds to step S42 in which the database 2 is updated to indicate that a tax has been paid. The operation then proceeds to step S44 in which a report is generated and sent to the revenue department indicating that the tax has been paid. The operation then proceeds to step S5 in which the payment is remitted to the revenue agency 4.

If the payment is not received within the specified time period, i.e. NO in step S40, the operation then proceeds to step S41. In step S41 it is determined whether a time for an alternative collection process has arrived. For example, a purchaser may be given 90 days to voluntarily remit the due tax. If this time period has not expired, i.e. NO in step S41, the operation then proceeds to step S45, in which the database 2 is updated to indicate that no payment has been received. The operation can then proceed again to step S3 where a new tax due notice is generated and sent, and this new tax due notice can then indicate that payment is late. In the example noted above, a purchaser may be given 90 days to fully pay a due tax. When this time period expires, i.e. YES in step S41, the operation then proceeds to step S43 where the payment can be collected via alternative methods. The alternative methods can involve state action such as garnishment of wages, obtaining judgments, etc. The form that the alternative collection methods can take will be controlled by the procedures of the revenue agency 4. If the amount of remitted tax does not reconcile with the amount recorded in the database 2, an automated audit mechanism is initiated that will determine a remaining amount of tax due and trigger the issuance of another tax due notice (or provide a refund if the tax is overpaid). Alternative, if the remittance does not reconcile with recorded tax owed, the network computer places the taxpayer's ID on a list for manual inspection and auditing so as to resolve the payment discrepancy.

Upon receipt of payments, which will be made via lockboxes in each state (or secure electronic exchange), the inventive computer-based system then generates a transmission report on all collections received since the last remittance payment to a state. The transmission report authorizes the treasury function to wire a payment of all receipts, less network fees, to the appropriate revenue agency. The treasury function within the Network wires funds to the revenue departments which concludes all network activities on all billing statements included in the remittance.

It should also be noted that in either the auditing operation or the operation of accessing the sellers file 7 or central data warehouse 8, information can be gathered that certain purchases were returned, and that therefore no tax is due on such returned purchases. In this instance, when records of returned purchase are received, the database 2 can be updated to delete the recording of corresponding sales transaction so that a purchaser is not improperly billed for a returned purchase.

As noted above, a further drawback in currently existing tax collection systems is that even if a seller wishes to collect appropriate sales taxes, it is a cumbersome procedure as a result of the numerous tax rates of various jurisdictions and the different rules as to what items are taxable in the different jurisdictions. Even further, once a seller does collect a tax a seller must then route the tax to the appropriate jurisdiction. As noted above, there are thousands of different taxing jurisdictions just within the United States. Obviously it would be cumbersome on the seller to collect the appropriate tax and then route the appropriate tax to the appropriate revenue agency.

One further system which simplifies the entire operation of collecting taxes on currently untaxed interstate sales is to require a seller to only collect a fixed simplified tax for every interstate sale. Levying such a tax would undoubtedly require Congressional action. For example, a seller may be required to collect a 3% tax for all interstate sales which are otherwise not taxed. This tax collection process would be simplified to the point of not being a burden on the seller, i.e. the seller would then not be required to keep track of tax procedures for the thousands of taxing jurisdictions in existence. Then, the seller downloads the information of the sales to a database, along with the payments collected. The database then organizes the data received, and based on such data, routes the collected funds to the appropriate revenue agency. Such an operation would simplify tax collection and would ensure that the appropriate revenue agency at least received a certain revenue based on the simplified tax rate from a sale which is currently completely untaxed.

Figure 6:
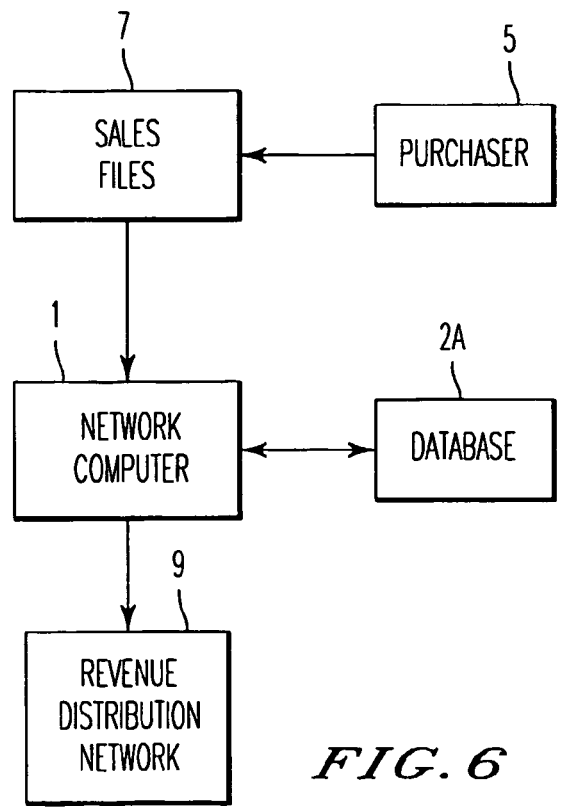
FIG. 6 is a block diagram of a system configuration of a further embodiment of the present invention.
Figure 12:
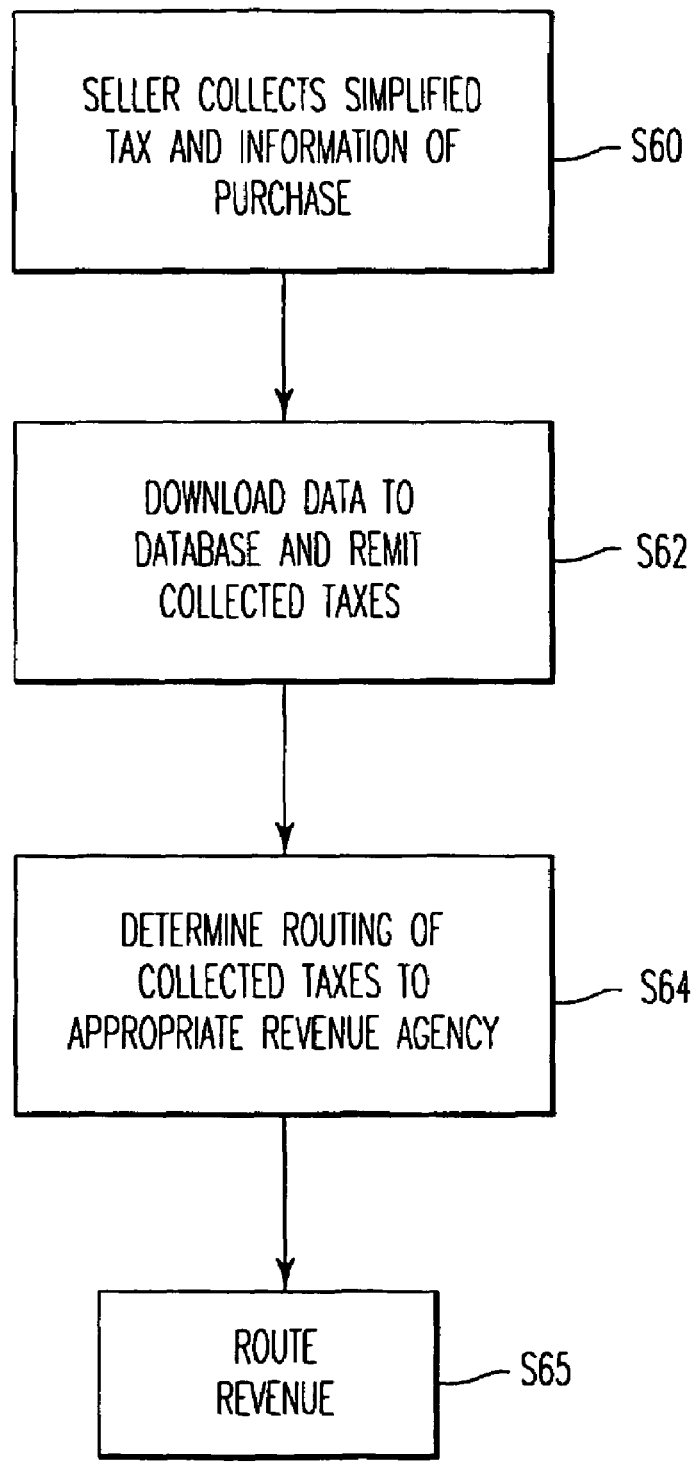
FIG. 12 is a flow diagram of an overall process control system operation in the further embodiment of the present invention of FIG. 6.
Figure 14:
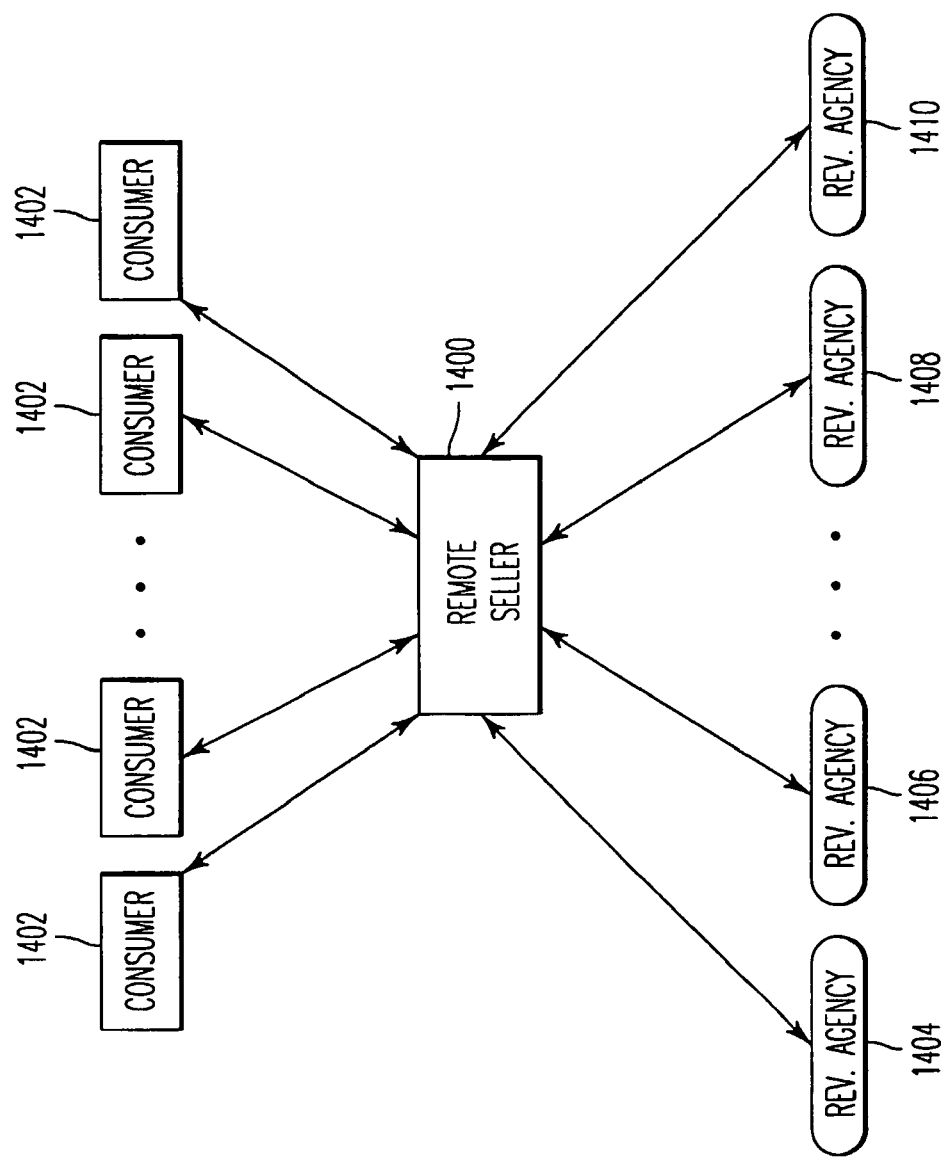
FIG. 14 is a block diagram illustrating a burden that would be placed on a remote seller if required to collect sales taxes on behalf of different jurisdictions.
Figure 13:
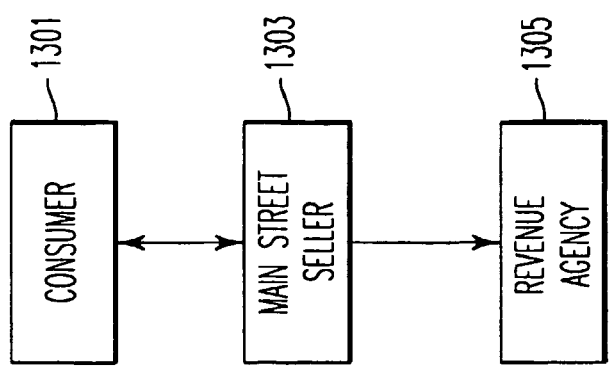
FIG. 13 is a flow diagram of a process flow of a conventional single-jurisdiction transaction including sales tax collection and remittance.

Such a further system of the present invention is shown in FIG. 6, and a corresponding control operation is shown in FIG. 12. As shown in FIGS. 6 and 12, the seller still maintains sales records 7 of purchases from a purchaser 5. The seller, however, also collects a simplified tax and information of the purchaser 5, see step S60. The seller then transmits such sales files 7 to a database 2A of the network computer 1, see step S62. However, the seller also transmits the collected revenues from such sales transactions through the network computer 1. The network computer then stores such data in the database 2A and stores the collected revenue in an appropriate account. This database 2A can store at least the same data as noted in FIG. 4 of the sales transactions. However, this database 2A can also store a record of the amount of tax received from the sales transaction. The network computer 1 then determines for each reported sales transaction the appropriate revenue agency to receive the collected simplified tax. This determination can be made based on the percentage of collected revenue per respective purchaser taxing jurisdiction. The network computer then transmits through a revenue distribution network 9 the appropriate revenue sources to the appropriate revenue agency based on the reported sales, see step S65.

As a concrete example, if 10% of sales by a seller are to residents of New York City, the database 2A will store records of such sales and thereby 10% of the revenue collected by the seller would then be distributed to the revenue collecting agency of New York City by the revenue distribution network 9.

In this way, this operation of the present invention can provide revenue on currently untaxed sales transactions to an appropriate revenue agency, although at a simplified tax rate. However, by providing such revenue at a simplified tax rate, a burden of collecting such taxes on the seller is minimized.

It is envisioned that a substantial culture change will have to take place as purchasers become accustomed to paying their tax obligations on Internet and mail order purchases. An employee of the operator of the network computer inventor will have data readily available on any purchaser who has received a bill. If a purchaser makes an incoming call to the network, the representative will access the tax due bill and all associated data on the purchase. The network employee can work as an agent for the revenue department under whose name the bill was mailed. As such, customer service telephone numbers will appear on each and every statement. Each number is specific to a particular state and only representatives with expertise in the sales tax requirements for a particular state will respond to the incoming calls.

In such a case, it is expected that the purchaser will dispute the tax due for two primary reasons: similar purchases were never previously taxed or because sales data obtained via the original audit was erroneous. On the matter of the first issue, each representative is educated in the sales tax structure of the particular state. The representative will review the provisions within the state tax code that outlines the state's right to tax the purchase which was made. As a registered agent for the revenue department for the state, the representative will review the rights and remedies the revenue department has for collecting taxes which are due, and specifically the rights and remedies the revenue department has for collecting sales and use taxes.

On the second matter, in which the purchaser contests the bill due to erroneous audit information, the account is suspended while an investigation ensues. To the extent possible, re-verification of the purchase is made with the prominent seller.

A percentage of bills will not be paid without follow up and collection efforts. Calls are made by a collection group working for the Network. Collection efforts will differ by each state and are governed by the applicable rights of the respective revenue department for other similar tax collections. The method and remedies of collection is programmed into the network computer 1. These remedies are evident to the network employee as collection efforts commence. The recovery of unpaid, outstanding tax bills will follow prescribed patterns as laid out by the revenue agency for that state.

Tax payments are made to commercial lock box systems in each state which is swept daily by a commercial service specializing in such activities. Alternatively electronic payments are made by way of the "dial-in" access, or secure electronic transactions, for example. Each tax due notice mailed to a purchaser will include a pre-addressed envelope. The envelope is addressed to the respective revenue department at a post office box within the city in which the revenue department is based. The post office box is managed by a commercial service specializing in lock box management, funds management and wire transfers.

The commercial service will wire the funds to the treasury department within the network for accounting and registration against the receivable for each purchaser. At that time, an electronic notation is made in the accounts receivable section of the database 2 to reflect the date and amount of the receipt on transaction by transaction basis.

The operation and structure of the present invention as discussed above have focused on interstate sales which are currently not being taxed. However, the infrastructure of the present invention as discussed above is useful in other applications in analogous situations in which revenue must be efficiently and appropriately distributed among different taxing entities.

As some other concrete examples of the present invention, which examples are by no way an exhaustive list of applications, if a national sales tax was implemented, the infrastructure employed by the system of the present invention could ease in the distribution of collected revenues to an appropriate revenue agency.

As another concrete example, the current system of collecting gas and highway taxes is extremely complicated in that the collection of such taxes attempts to correlate the distribution of the taxes paid based on actual resource usage. The present invention could ensure the efficient and accurate redistribution of gas and highway taxes to appropriate revenue agencies.

Further, issues of distributing a tax collected at only one point to different entities will arise in the formation of the European Union. In the formation of the European Union, a tax may only be collected at a final point of sale, but such a tax may be required to be distributed among different revenue agencies, which can encompass different countries. In this instance, the system of the present invention could be particularly effective in ensuring the efficient and appropriate routing of such collected tax revenues.

Figure 15:
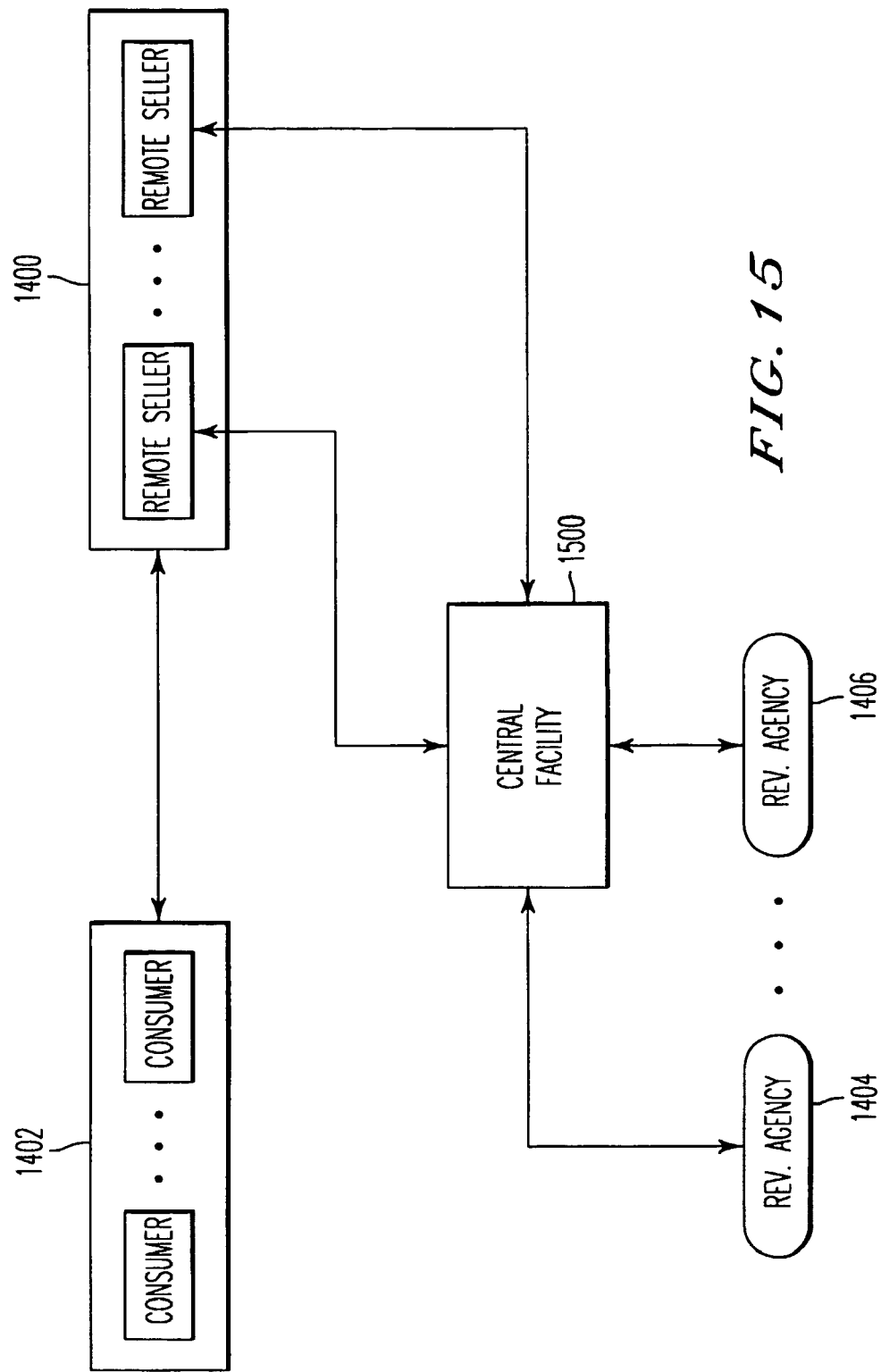
FIG. 15 is a block diagram showing a network architecture according to the present invention that includes a central facility that coordinates tax rate, tax collection, tax remittance, and return filings for sales made between remote sellers and consumers from different jurisdictions.

FIG. 15 shows a "central facility" based system for assisting remote sellers and revenue agencies in multiple jurisdictions in collecting taxes at the point of sale, on behalf of revenue agencies in multiple jurisdictions. While the present discussion and embodiment is directed to sales transactions, the architecture shown in FIG. 15 is also applicable for other taxes, including wage taxes, transportation taxes and the like, which apply to multiple jurisdictions that impose different taxable rates on different goods or services. Furthermore, the application may also apply to value added tax situations.

A characteristic feature of the architecture shown in FIG. 15, is that direct communications exist between consumers 1402 and remote sellers 1400. Any particular consumer 1402 may attempt to purchase something from a remote seller 1400, where the remote seller 1400, by law, will have a tax collection burden to collect a tax at a particular rate as set by a particular jurisdiction associated with that particular consumer. The remote seller 1400 has a computer facility that communicates via a communication link (e.g., an Internet connection, proprietary wired connection or wireless connection) to a central facility 1500. Alternatively, as opposed to a data connection, the remote seller 1400 may also use the central facility 1500 in a voice-capacity, where the remote seller 1400 communicates with an operator at the central facility 1500. The remote seller communicates with the consumer 1402, receiving address information so that the remote seller will have information appropriate to determine which taxing jurisdictions will apply for a transaction between the consumer 1402 and the remote sellers 1400. Once the address information is known, the remote seller may contact the central facility 1500, by way of a web "portal", or other data/user interface so as to receive updated tax rate (which may be a function of the purchased product) information saved at the central facility 1500. Alternatively, the remote seller may from time to time, say overnight for example, download updated tax rate information from the central facility 1500 with up-to-date information regarding the tax rates imposed by the 6,500 or so jurisdictions in the United States or other jurisdictions outside the United States. The remote seller after having received the appropriate tax-rate information, calculates the tax due, or alternatively relies on the central facility 1500 to calculate the tax due from the consumer when making the purchase for a particular item. The tax rate-information will be subject matter-sensitive, based on the type of information that is purchased by the consumer 1402. This is the case because different items are taxed at different rates in some jurisdictions.

The central facility 1500 also communicates over secure data communication links with revenue agencies 1404 through 1406, where the revenue agencies provide present tax rate information to the central facility 1500 for different jurisdictions handled by the respective revenue agencies. In this way, the central facility 1500 conveniently holds in a database updated tax rate information for each of the different jurisdictions that may apply for a particular remote seller. Once the remote seller receives payment for a particular item, the remote seller automatically remits the taxable portion of that transaction to the central facility 1500, along with the relevant sales data, so that the central facility 1500 may prepare an electronic data file associated with that taxable event and remit the appropriate finds to the revenue agency in a relatively short period of time such as between 10 days and instantly. The central facility 1500 remits the funds through a secure treasury function as managed by a national bank depository. The central facility 1500 may employ encrypted communication links with the different revenue agencies and optionally with the different remote sellers.

The central facility 1500 assists remote sellers 1400 in registering with the different revenue agencies 1404 through 1406 as shown in FIG. 15, by providing a computer-interface (such as a web portal) that prompts the remote seller to provide information needed to register in each of the different jurisdictions handled by the revenue agencies 1404 through 1406. In order to become a remote seller that serves as a tax collection agent for the different taxing jurisdictions, that remote seller need only register once with the central facility 1500, which in turn communicates this information with the different revenue agencies 1404 through 1406 in order to recognize that particular remote seller as a registered remote seller. The central facility 1500 keeps track of the registration information for that particular remote seller at the different revenue agencies, and stores registration numbers and identifications assigned by the different revenue agencies in a database to be used in correspondence and data transfers to and from the respective remote sellers and revenue agencies.

Figure 16:
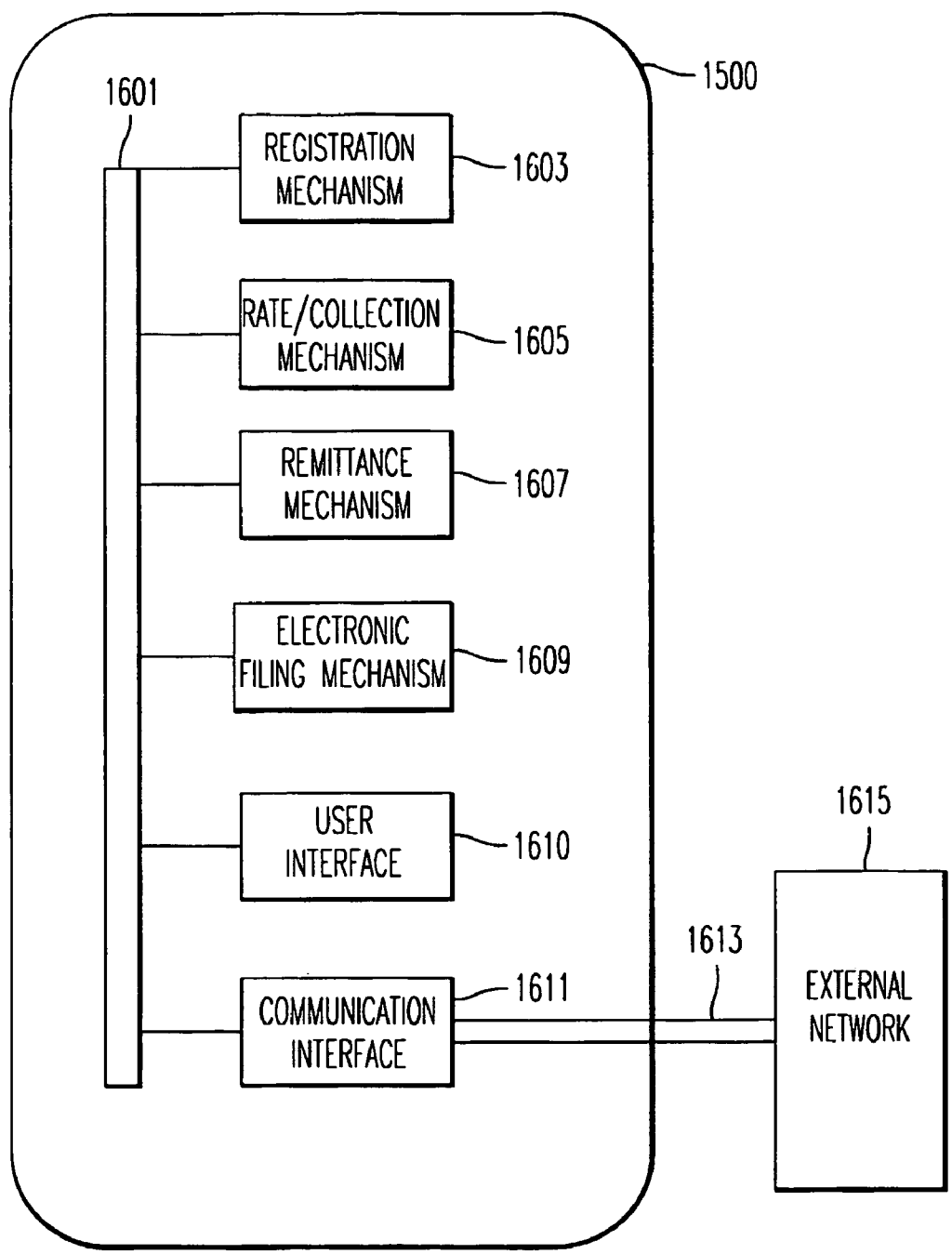
FIG. 16 is a block diagram of selected components within a central facility as shown in FIG. 15.

FIG. 16 is a block diagram with a central facility 1500 that includes the computer resources shown in FIG. 5, for example. Using the network controller 10, as shown in FIG. 5, as well as the associated components that are connected therewith, the central facility 1500 implements a registration mechanism 1603, a rate/collection mechanism 1605, a remittance mechanism 1607, an electronic filing mechanism 1609, a user interface 1610, and a communications interface 1611. Each of these different mechanisms 1603-1611 communicate by way of an Intranet, or communication bus 1601. The communication interface 1611 receives and sends information to and from the central facility 1500 by way of an external connection 1613 to the external network 1615. The external network 1615 may be any one of different communication mechanisms including Internet connection, wireless connections, local proprietary communication services or the like. The registration mechanism 1603, will be discussed in more detail with regard to FIG. 17 which shows the process flow employed by the registration mechanism 1603 in order to register each of the different remote sellers with the different participating tax jurisdictions. The rate/collection mechanism 1605, on a periodic basis, such as a daily basis, provides inquiries (data or voice inquiries) to the different revenue agencies 1404-1406, regarding changes in taxation rules for that particular jurisdiction. Alternatively, the rate/collection mechanism 1605 may receive the updated information from a subscription service that provides tax information updates. The rate/collection mechanism 1605 then updates a computer-stored database that is used to distribute the rate information to the different remote sellers.

The remittance mechanism 1607, receives an electronic transfer of fluids from the remote sellers, after the remote sellers have collected payments for given purchases. The remittance mechanism cooperates with the electronic filing mechanism 1609, to correlate particular taxable events, with electronically transferred funds and registration numbers of the remote sellers for collected funds for providing an electronic remittance of the funds to the national bank depository assigned for the particular revenue agencies. The remittance mechanism 1607, reconciles payments made by the different remote sellers with records regarding certain sales made by the remote sellers. When discrepancies are identified, a notice is generated that is serviced by a service operator by questioning the particular remote seller regarding the transaction to determine whether a taxable event occurred or not. Alternatively, a computerized inquiry may be made so as to automatically query the remote seller, or alternatively automatically query and receive a response by the computer equipment employed by the remote seller.

The user interface 1610, is conveniently provided in the form a web page (or other graphics interface or other information conveyance mechanism) that allows remote sellers, treasury functions and system administrators to input data and respond to inquiries made by the respective entities.

FIG. 17 is a flow chart explaining a process flow for registering a particular remote seller with revenue agencies by way of the central facility. The process begins in step 1701 where the remote seller initiates a remote selling business. The process then proceeds to step 1703 where the remote seller contacts the central facility, informing the central facility that the remote seller wishes to serve as a tax collection agent for the different tax jurisdictions. The process then proceeds to step 1705 where the central facility prompts the remote seller for all the different registration information that would be required by an aggregation of all of the different taxing agencies. The process then proceeds to step S1707 where the central facility registers the remote seller in all participating tax jurisdictions by way of computer communication with those tax jurisdictions. Alternatively a manual process is employed to register the new remote seller. The process then in step S1709 proceeds with the central facility storing the different registration numbers for that particular remote seller in the different taxing jurisdictions, so that the registration numbers may be used in a reporting and remittance operations previously discussed.

FIG. 18 is a flow chart describing a process where a consumer in jurisdiction A makes a purchase request from a particular remote seller. The process then proceeds to step 1803 where the remote seller consults with the database 4, identifying the particular tax rate information associated with jurisdiction A. This tax rate information may include several different tax rates associated with a state, and locality for jurisdiction A. The process then proceeds to step 1805 where either the remote seller or the central facility calculates the tax due for a particular transaction and receives the money from the consumer. Subsequently, the process proceeds to step 1807 where the remote seller remits funds electronically to the central facility on behalf of the tax revenue agencies that correspond with jurisdiction A. The process then proceeds to step 1809 where the remote seller sends sales and remittance information to the central facility as electronic data file so the central facility may electronically remit the funds and electronically file a statement of the tax remittance.

The mechanisms and processes set forth in the present description may be implemented using a conventional and general purpose microprocessor programmed according to the teachings of the present invention, as appreciated by those skilled in the relevant art(s). Appropriate software coding can readily be prepared by skilled programmers based on the teachings of the present disclosure, as will also be apparent by those skilled in the relevant art(s).

The present invention thus includes a computer-based product which may be hosted on a storage medium and include instructions which can be used to program a computer to perform a process in accordance with the present invention. This storage medium can include, but is not limited to, any type of disk including floppy disk, optical disk, CD-ROMS, magneto-optical disks, ROMS, RAMS, EPROMS, EEPROMS, flash memory, magnetic or optical cards, or any type of media suitable for storing electronic instructions.

Obviously, numerous additional modifications and variations of the present invention are possible in light of the above teachings. It is therefore to be understood that within the scope of the appended claims the present invention may be practiced otherwise than as specifically described herein.

The invention claimed is:

1. A method of tax collection and remittance, comprising:
   sending a sales information message regarding a taxable event from a remote seller to a central facility, said sales information message identifying a tax jurisdiction of a participant in said taxable event, said remote seller not having a nexus in said tax jurisdiction;
   identifying tax rate information for the tax jurisdiction;
   providing the tax rate information from the central facility to the remote seller for the tax jurisdiction of the participant;
   calculating, via a computer, a tax due from the tax rate provided in said providing; and
   collecting a tax payment in an amount calculated in the calculating.

2. The method of claim 1, wherein:
   said collecting includes receiving the tax payment and forwarding the tax payment from the remote seller to the central facility.

3. The method of claim 2, further comprising:
   remitting said tax payment from said central facility to a revenue agency responsible for collecting taxes for said tax jurisdiction.

4. The method of claim 3, further comprising:
   registering said remote seller with said revenue agency, including providing remote seller information to said central facility, and
   said central facility communicating the remote seller information to the revenue agency and receiving a tax payer identification for said remote seller from said revenue agency.

5. The method of claim 4, further comprising:
   registering said remote seller in another tax jurisdiction so that if said remote seller collects taxes from another participant in a future taxable event, the remote seller is registered to remit taxes collected on behalf of the another tax jurisdiction.

6. The method of claim 1, wherein said sending includes sending said sales information to said central facility over an Internet connection, a communications interface for said central facility being an Internet website.

7. The method of claim 1, wherein said sending includes sending said sales information in an encrypted message.

8. The method of claim 1, wherein said calculating includes calculating said tax due at said central facility and informing said remote seller of the tax due.

9. The method of claim 1, wherein said calculating includes said remote seller calculating said tax due using the tax rate provided in said providing.

10. The method of claim 1, wherein said providing comprises providing tax rate information for revenue agencies responsible for particular geographical areas identified by said remote seller.

11. The method of claim 1, wherein said providing comprises providing tax rate information for all tax jurisdictions in the United States.

12. The method of claim 1, further comprising:
    identifying a product-specific tax rate for an item purchased in said taxable event, wherein said providing includes providing said product-specific tax rate as part of said tax rate information.

13. The method of claim 1, wherein said sending includes sending said sales information with at least a portion of an address at which said participant was located when participating in said taxable event.

14. The method of claim 1, further comprising:
    sending remote seller identification information to the central facility;
    formatting said remote seller identification information in separate application formats accepted by respective revenue agencies in multiple jurisdictions;
    sending each separate application format to a corresponding one of the revenue agencies;
    receiving from each of the revenue agencies a registration identification associated with each of the revenue agencies; and
    saving at said central facility, each registration identification for use in remitting collected taxes by said remote seller to respective of the revenue agencies.

15. The method of claim 14, wherein said registration identification is a tax payer registration number.

16. The method of claim 14, further comprising:
    reporting said registration identification to said remote seller; and
    including said registration identification when remitting collected taxes to said central facility.

17. The method of claim 14, wherein said remote seller initiates said registration process by logging onto an Internet website hosted at said central facility and providing information to said central facility through an Internet browser.

18. A method of tax collection and remittance, comprising:
    sending a digital message with jurisdiction-specific tax rate information from a central facility to a remote seller;
    saving said jurisdiction-specific tax rate information in memory at a computing facility operated by said remote seller;
    receiving by said remote seller location information from a purchaser in a remote sales transaction with said remote seller, said remote seller not having a nexus in a tax collection jurisdiction in which said purchaser is located;
    retrieving from memory a tax rate for an item purchased in said remote sales transaction and for the tax collection jurisdiction in which said purchaser is located;
    calculating a tax amount using said tax rate retrieved in said retrieving; and collecting said tax amount from said purchaser by said remote seller.

19. The method of claim 18, further comprising:
remitting said tax amount to said central facility.

20. The method of claim 19, wherein said remitting includes informing said central facility of an identification of said remote seller, remitting said tax amount to a tax collection agency for said tax jurisdiction in which said purchaser is located, and informing said tax collection agency of a tax payer registration identification of said remote seller.

21. A remote sales tax collection and remittance system, comprising:
   means for sending a sales information message regarding a taxable event from a remote seller to a central facility, said sales information message identifying a tax jurisdiction of a participant in said taxable event, said remote seller not having a nexus in said tax jurisdiction;
   means for providing tax rate information from the central facility to the remote seller for the tax jurisdiction of the participant;
   means for identifying tax rate information for the tax jurisdiction;
   means for calculating a tax due from the tax rate provided by said means for providing; and
   means for collecting a tax payment in an amount calculated by said means for calculating.

22. The remote sales tax collection and remittance system of claim 21, further comprising:
   means for sending remote seller-unique information to the central facility;
   means for formatting said remote seller-unique information in separate application formats accepted by respective revenue agencies in multiple jurisdictions;
   means for sending each separate application format to a corresponding one of the revenue agencies;
   means for receiving from each of the revenue agencies a registration indication associated with each of the revenue agencies; and
   means for saving at said central facility each registration indication for use in remitting collected taxes by said remote seller to respective of the revenue agencies.

23. A remote sales tax collection and remittance system, comprising:
   means for sending a digital message with jurisdiction-specific tax rate information from a central facility to a remote seller;
   means for saving said jurisdiction-specific tax rate information in memory;
   means for receiving by said remote seller location information from a purchaser in a remote sales transaction with said remote seller, said remote seller not having a nexus in a tax collection jurisdiction in which said purchaser is located;
   means for retrieving from memory a tax rate for an item purchased in said remote sales transaction and for the tax collection jurisdiction in which said purchaser is located;
   means for calculating a tax amount using said tax rate retrieved by said means for retrieving; and
   means for collecting said tax amount from said purchaser by said remote seller.

24. A computer-based central facility for disseminating tax rate information to a remote seller, comprising:
   a memory configured to hold tax rate information for multiple tax jurisdictions;
   a communications interface configured to be connected to a digital communication channel that interconnects the computer-based central facility with a computing facility of the remote seller, said communications interface being configured to exchange digital messages over the communications channel with said remote seller regarding a remote sales transaction made between the remote seller and a purchaser, said purchaser being located in a tax jurisdiction in which said remote seller has no nexus, said tax jurisdiction being one of the multiple tax jurisdiction in which said memory holds a tax rate for the tax jurisdiction; and
   a processor configured to execute computer-readable instructions stored in a computer readable medium so as to implement
      a sales information reception mechanism configured to extract an identification of said tax jurisdiction from a sales information message sent from said remote seller regarding the remote sales transaction made with said purchaser, and
      a tax rate distribution mechanism configured to send a tax rate message to said remote seller via said communications interface, said tax rate message including the tax rate for the tax jurisdiction of the purchaser, so said remote seller can calculate an amount of tax due from said purchaser based on the remote sales transaction.

25. The computer-based central facility of claim 24, wherein said processor implements
   a remote seller registration mechanism configured to receive from said remote seller information and send said remote seller information to respective registration agencies for the multiple tax jurisdictions, and
   a registration recordation mechanism configured to receive respective registration identifications from the respective registration agencies for the remote seller and store the respective registration identifications in said memory.

26. The computer-based central facility of claim 25, wherein said processor implements a tax remittance mechanism that forwards a tax payment collected by said remote seller to a collection agency for the tax jurisdiction of the purchaser along with the registration identification of said remote seller for the tax jurisdiction.

27. The computer-based central facility of claim 24, wherein said communications interface includes an Internet web site, and said communications channel includes at least one of a wired and a wireless communications link configured to carry Internet traffic.

28. The computer-based central facility of claim 27, wherein said communications interface includes a data encryption mechanism configured to encrypt and decrypt messages communicated to the remote seller and respective tax collection agencies.

29. The computer-based central facility of claim 24, wherein said processor is configured to identify from said sales information message a type of product purchased by said purchaser, and identify whether a predetermined tax rate applies for the product.

30. The computer-based central facility of claim 24, wherein
   the communications interface is configured to connect the computer-based central facility with respective registration agencies of the multiple tax jurisdictions, said communications interface being configured to receive a registration request message
   from said remote seller, said registration request message including specific information about the remote seller; and the processor is configured to execute the computer-readable instructions stored in the computer readable medium as so to implement a data formatting mechanism configured to arrange separate messages for the registration agencies with the specific information about the remote seller arranged as required by each registration agency, and a registration reporting mechanism configured to send the separate messages to the registration agencies so as to register the remote seller with the multiple tax jurisdictions.

31. The computer-based central facility of claim 30, wherein:

said processor is configured to remit a tax payment collected by the remote seller to a revenue collection agency responsible for collecting taxes for taxable purchases made by said purchaser, said processor including with the tax payment a registration identification issued by the registration agency affiliated with revenue collection agency.

32. The computer-based central facility of claim 30, wherein said communications interface includes an Internet web site, and said communications channel includes at least one of a wired and a wireless communications link that carries Internet traffic.

33. The computer-based central facility of claim 30, wherein said communications interface includes a data encryption mechanism configured to encrypt and decrypt messages communicated to the remote seller and respective tax collection agencies.

34. A remote sales tax collection and remittance system, comprising:

a sending unit configured to send a sales information message regarding a taxable event from a remote seller to a central facility, said sales information message identifying a tax jurisdiction of a participant in said taxable event, said remote seller not having a nexus in said tax jurisdiction;

a providing unit configured to provide tax rate information from the central facility to the remote seller for the tax jurisdiction of the participant;

an identifying unit configured to identify tax rate information for the tax jurisdiction;

a calculating unit configured to calculate a tax due from the tax rate provided by said providing unit; and a collecting unit configured to collect a tax payment in an amount calculated by said calculating unit.

* * * * *